United States Patent
Lee et al.

(10) Patent No.: US 8,341,481 B2
(45) Date of Patent: Dec. 25, 2012

(54) METHOD FOR PERFORMING HYBRID AUTOMATIC REPEAT REQUEST OPERATION IN A WIRELESS MOBILE COMMUNICATION SYSTEM

(75) Inventors: Mi-Hyun Lee, Seongnam-si (KR);
Jae-Weon Cho, Suwon-si (KR);
Ho-Kyu Choi, Seongnam-si (KR);
Su-Ryong Jeong, Suwon-si (KR);
Chi-Woo Lim, Suwon-si (KR);
Ki-Chun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 12/708,060

(22) Filed: Feb. 18, 2010

(65) Prior Publication Data
US 2010/0211845 A1 Aug. 19, 2010

(30) Foreign Application Priority Data

| | | |
|---|---|---|
| Feb. 19, 2009 | (KR) | 10-2009-0014119 |
| Apr. 30, 2009 | (KR) | 10-2009-0038568 |
| Jul. 7, 2009 | (KR) | 10-2009-0061911 |
| Aug. 28, 2009 | (KR) | 10-2009-0080696 |
| Nov. 10, 2009 | (KR) | 10-2009-0107899 |

(51) Int. Cl.
*G08C 25/02* (2006.01)
(52) U.S. Cl. .......... 714/748; 714/775; 714/749; 714/18; 370/312; 370/328; 370/330
(58) Field of Classification Search ........................ None
See application file for complete search history.

(56) References Cited

U.S. PATENT DOCUMENTS

| | | | |
|---|---|---|---|
| 7,209,749 B2 | 4/2007 | Kwak et al. | |
| 7,299,065 B2 | 11/2007 | Choi et al. | |
| 2003/0110435 A1 | 6/2003 | Wu et al. | |
| 2006/0146762 A1* | 7/2006 | Kuroda et al. | 370/335 |
| 2007/0300120 A1 | 12/2007 | Kim et al. | |
| 2009/0204863 A1* | 8/2009 | Kim et al. | 714/748 |
| 2010/0061243 A1 | 3/2010 | Yi et al. | |
| 2011/0041027 A1* | 2/2011 | Fong et al. | 714/749 |
| 2011/0199975 A1* | 8/2011 | Wu | 370/328 |
| 2011/0310784 A1* | 12/2011 | Park | 370/312 |

FOREIGN PATENT DOCUMENTS

| | | |
|---|---|---|
| EP | 1 890 440 A2 | 2/2008 |
| JP | 2006-191312 A | 7/2006 |
| KR | 10-2006-0055215 A | 5/2006 |
| RU | 2 287 220 C2 | 11/2006 |

* cited by examiner

*Primary Examiner* — John Trimmings
(74) *Attorney, Agent, or Firm* — Jefferson IP Law, LLP

(57) ABSTRACT

A method for performing a Hybrid Automatic Repeat reQuest (HARQ) operation in a wireless mobile communication system that uses Frequency Division Duplex (FDD) or Time Division Duplex (TDD) frames each having a plurality of subframes for communication are provided, in which an HARQ timing including a transmission time of a data burst and a transmission time of an HARQ feedback, for DL HARQ is determined according to data burst assignment information transmitted in a #l DownLink (DL) subframe of a #i frame, and an HARQ operation is performed according to the determined HARQ timing. At least one frame index and at least one subframe index that represent the HARQ timing are determined by using l and i.

60 Claims, 24 Drawing Sheets

| odd-hop | DL | | i | UL | |
|---|---|---|---|---|---|
| | DL Tx RS → MS (RS) | DL Rx BS → RS | | UL Rx RS ← MS | UL Tx RS (BS) ← RS |
| R. subframe index # | 0 | 2 | | 0 | 1 |

* R. subframe index # = Reordered subframe index #

FIG.15A

| even-hop | DL | | | UL | |
|---|---|---|---|---|---|
| | DL Tx RS → MS | DL Rx RS → RS | DL Tx RS → MS | UL Tx RS ← RS | UL RS Rx ← MS |
| R. subframe index # | 0 | | 1 | | 0 | 1 |

\* R. subframe index # = Reordered subframe index #

METHOD FOR PERFORMING HYBRID AUTOMATIC REPEAT REQUEST OPERATION IN A WIRELESS MOBILE COMMUNICATION SYSTEM

PRIORITY

This application claims the benefit under 35 U.S.C. §119(a) to a Korean patent application filed in the Korean Intellectual Property Office on Feb. 19, 2009 and assigned Serial No. 10-2009-0014119, a Korean patent application filed in the Korean Intellectual Property Office on Apr. 30, 2009 and assigned Serial No. 10-2009-0038568, a Korean patent application filed in the Korean Intellectual Property Office on Jul. 7, 2009 and assigned Serial No. 10-2009-0061911, a Korean patent application filed in the Korean Intellectual Property Office on Aug. 28, 2009 and assigned Serial No. 10-2009-0080696, and a Korean patent application filed in the Korean Intellectual Property Office on Nov. 10, 2009 and assigned Serial No. 10-2009-0107899, the entire disclosures of all of which are hereby incorporated by reference.

BACKGROUND OF THE INVENTION

1. Field of the Invention

The present invention relates to a wireless mobile communication system. More particularly, the present invention relates to a method for performing a Hybrid Automatic Repeat reQuest (HARQ) operation in a wireless mobile communication system.

2. Description of the Related Art

Wireless mobile communication systems have been developed to provide a variety of services including a broadcasting service, a multimedia video service, a multimedia messages service, and the like. Future-generation wireless mobile communication systems are under development with the aim to provide a data service at or above 100 Mbps to fast moving users and at or above 1 Gbps to slowly moving users.

In a wireless mobile communication system, a reduced control overhead and a short latency are required for high-speed transmission and reception of reliable data between a Base Station (BS) and a Mobile Station (MS). In order to decrease control overhead and latency, a Hybrid Automatic Repeat reQuest (HARQ) technique may be employed.

When a transmitter transmits a signal carrying data to a receiver, the receiver feeds back an ACKnowledgment (ACK) signal indicating successful reception of the signal or a Negative ACK (NACK) signal indicating failed reception of the signal to the transmitter in a wireless mobile communication system implementing HARQ. Upon receipt of the ACK or NACK signal, the transmitter initially transmits new data or retransmits the transmitted data to the receiver according to an HARQ scheme. HARQ schemes may be categorized into two types, namely Chase Combining (CC) and Incremental Redundancy (IR).

Transmission and reception are performed on a frame basis during an HARQ operation, which does not decrease latency. Accordingly, a need exists for a new frame structure that shortens the latency of signal transmission and reception, and an HARQ operation timing structure for implementing the new frame structure.

SUMMARY OF THE INVENTION

An aspect of the present invention is to address at least the above-mentioned problems and/or disadvantages and to provide at least the advantages described below. Accordingly, an aspect of the present invention is to provide a method for controlling a Hybrid Automatic Repeat reQuest (HARQ) operation in a wireless mobile communication system.

Another aspect of the present invention is to provide a method for determining timings of transmitting a data burst, transmitting an HARQ feedback for the data burst, and retransmitting the data burst in a wireless mobile communication system.

A further aspect of the present invention is to provide a method for flexibly determining an HARQ operation timing according to the transmission time interval of a data burst and system capability in a wireless communication system.

In accordance with an aspect of the present invention, a method for performing an HARQ operation in a wireless mobile communication system that uses frames each having a plurality of subframes for communication is provided, in which an HARQ timing is determined according to data burst assignment information transmitted in a #l DownLink (DL) subframe of a #i frame, the HARQ timing including transmission time of a DL data burst and a transmission time of an HARQ feedback, for DL HARQ, and an HARQ operation is performed according to the determined HARQ timing. At least one frame index and at least one subframe index that represent the HARQ timing are determined by using l and i.

In accordance with another aspect of the present invention, a method for performing an HARQ operation in a wireless mobile communication system that uses frames each having a plurality of subframes for communication is provided, in which an HARQ timing is determined according to data burst assignment information transmitted in a #l DL subbframe of a #i frame, the HARQ timing including transmission time of a UpLink (UL) data burst, a transmission time of an HARQ feedback, and a retransmission time of the data burst, for UL HARQ, and an HARQ operation is performed according to the determined HARQ timing. At least one frame index and at least one subframe index that represent the HARQ timing are determined by using l and i.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 11A to 13B are diagrams illustrating HARQ operation timing structures based on DL-to-UL ratios according to exemplary embodiments of the present invention;

FIGS. 15A and 15B illustrate Relay Station (RS) frame structures in TDD according to exemplary embodiments of the present invention;

FIGS. 16A and 16B are diagrams illustrating HARQ operation timing structures for an odd-hop RS according to exemplary embodiments of the present invention;

FIG. 17 is a diagram illustrating an HARQ operation timing structure for an even-hop RS according to an exemplary embodiment of the present invention.

Throughout the drawings, it should be noted that like reference numbers are used to depict the same or similar elements, features and structures.

DETAILED DESCRIPTION OF EXEMPLARY EMBODIMENTS

Figure 1:
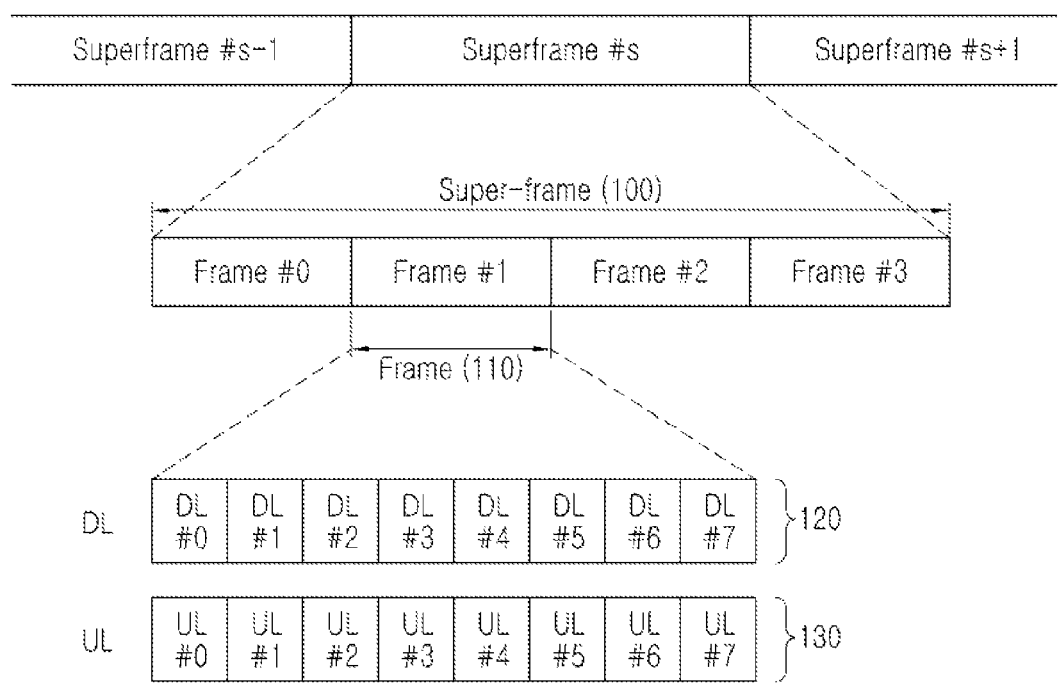
FIG. 1 illustrates a Frequency Division Duplex (FDD) superframe structure according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents It is to be understood that the singular forms "a," "an," and "the" include plural referents unless the context clearly dictates otherwise. Thus, for example, reference to "a component surface" includes reference to one or more of such surfaces.

Exemplary embodiments of the present invention are directed to a method for performing a Hybrid Automatic Repeat reQuest (HARQ) operation with a predefined HARQ retransmission latency in a wireless mobile communication system that operates in Frequency Division Duplex (FDD), Time Division Duplex (TDD), Half duplex-FDD (H-FDD), or both FDD and TDD. In TDD or H-FDD, a frame may be configured at various DownLink (DL)-to-UpLink (UL) ratios. Therefore, a DL duration and an UL duration may be symmetrical or asymmetrical in a frame.

Hereinbelow, a description will be made of signal transmission and reception between a Base Station (BS) and a Mobile Station (MS) based on a superframe structure according to an HARQ scheme. Each superframe includes one or more frames, each frame having one or more subframes. The term "subframe" is interchangeably used with "time slot". Each time slot or subframe includes one or more Orthogonal Frequency Division Multiple Access (OFDMA) symbols.

In an embodiment, Each of the BS and the MS may include a controller for generating and analyzing burst assignment information, determining an HARQ transmission time according to a later-described frame structure and HARQ operation timing, at least one HARQ processor for generating and analyzing a data burst, and an HARQ feedback at timings determined under the control of the controller, and a transceiver for transmitting and receiving the burst assignment information, the data burst, and the HARQ feedback. For example, the data burst assignment information may be delivered as an Advanced MAP (A-MAP) Information Element (IE) specifying resource allocation, and the data burst may be transmitted in a form of an HARQ subpacket generated according to an HARQ operation.

FIG. 1 illustrates an FDD superframe structure according to an exemplary embodiment of the present invention.

Referring to FIG. 1, a superframe 100 includes four frames 110 each frame having eight subframes. In FDD, DL subframes 120 directed from a BS to an MS and UL subframes 130 directed from an MS to a BS occupy different frequency bands.

Figure 2:
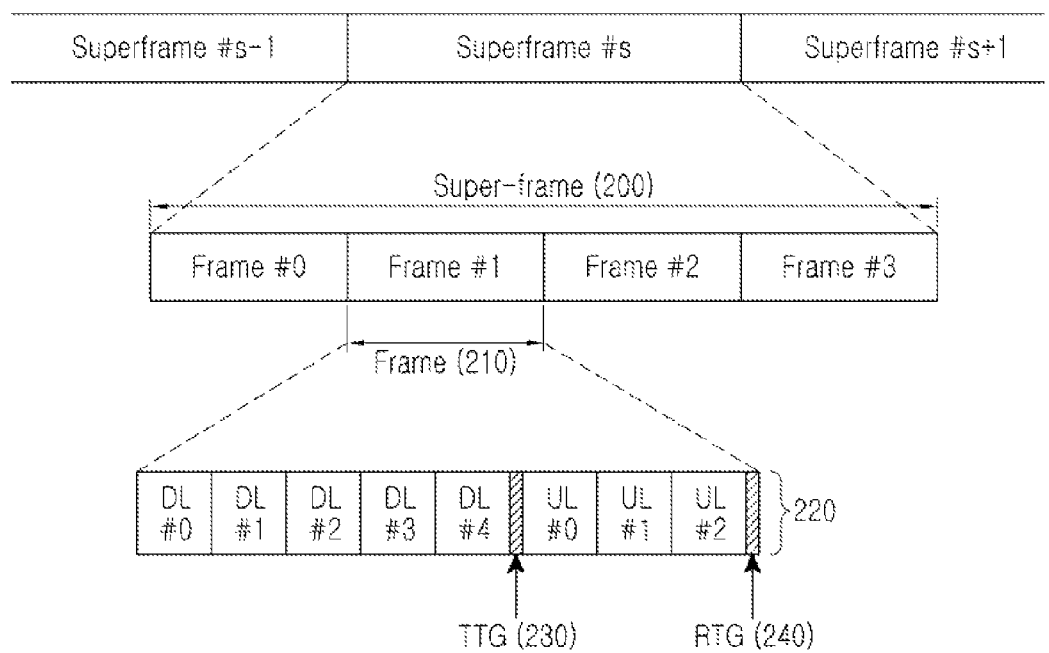
FIG. 2 illustrates a Time Division Duplex (TDD) superframe structure according to an exemplary embodiment of the present invention.

FIG. 2 illustrates a TDD superframe structure according to an exemplary embodiment of the present invention.

Referring to FIG. 2, a superframe 200 includes four frames 210 each frame having eight subframes 220. In TDD, a predefined number of subframes out of total subframes are used as DL subframes and the remaining subframes are used as UL subframes in each frame. In the illustrated case of FIG. 2, the DL-to-UL ratio is 5:3, which implies that five DL subframes are defined during a DL time period and three UL subframes are defined during a UL time period. A Transmit/receive Transition Gap (TTG) 230 is interposed between a DL subframe and the following UL subframe, and a Receive/transmit Transition Gap (RTG) 240 is interposed between a UL subframe and the following DL subframe.

While it is illustrated in FIGS. 1 and 2 that each superframe includes four frames each having eight subframes, the number of frames per superframe, N and the number of subframes per frame, F may vary depending on the bandwidth and subcarrier spacing of a wireless mobile communication system. In an Orthogonal Frequency Division Multiplexing/Orthogonal Frequency Division Multiple Access (OFDM/OFMDA) wireless mobile communication system having channel bandwidths of 5, 10 and 20 MHz, each frame may have eight subframes, whereas the number of subframes per frame may be 7 in an OFDM/OFDMA wireless mobile communication system with a channel bandwidth of 8.75 MHz. In addition, an OFDM/OFDMA wireless mobile communication system with a channel bandwidth of 7 MHz may have six subframes per frame. In addition, for a given bandwidth, the number of subframes per frame may be different according to a Cyclic Prefix (CP) length.

In HARQ, an initial transmission timing and a retransmission timing may be placed in a certain mapping relationship. This mapping relationship is referred to as an HARQ operation timing structure or an HARQ interlace. The HARQ operation timing structure or HARQ interlace refers to the relationship between a subframe carrying a MAP message that includes resource allocation information (i.e., control information) and a subframe carrying a signal in relation to the subframe carrying the MAP message, the relationship between the subframe carrying the signal and a subframe carrying a feedback for the signal, and the relationship between the feedback subframe and a subframe carrying initial transmission data or retransmission data in accordance with the feedback. A more detailed description of the HARQ operation timing structure or HARQ interlace is given as follows.

(1) Data burst assignment IE: it indicates a DL data burst or a UL data burst in a DL subframe.

(2) Data burst: a transmitter transmits a data burst in allocated resources according to the data burst assignment IE.

(3) HARQ feedback for received data burst: a receiver transmits an ACK or NACK signal according to whether an error has been found in the received data burst.

(4) Initial transmission of data burst or retransmission of data burst according to HARQ feedback: the transmitter retransmits the data burst upon receipt of the NACK signal. The transmitter may further provide resource allocation information for the retransmission. On the other hand, upon receipt of the ACK signal, the transmitter may initially transmit a new data burst.

HARQ schemes may be classified into asynchronous HARQ and synchronous HARQ. An HARQ operation timing structure specified as (1), (2) and (3) needs to be defined for asynchronous HARQ, whereas an HARQ operation timing structure specified as (1) to (4) needs to be defined for synchronous HARQ. To define these HARQ operation timing structures, at least one DL subframe in a DL period should be in a predefined mapping relationship with at least one UL subframe in a UL period.

Now a detailed description will be made of HARQ operation timings for FDD and TDD modes.

Figure 3:
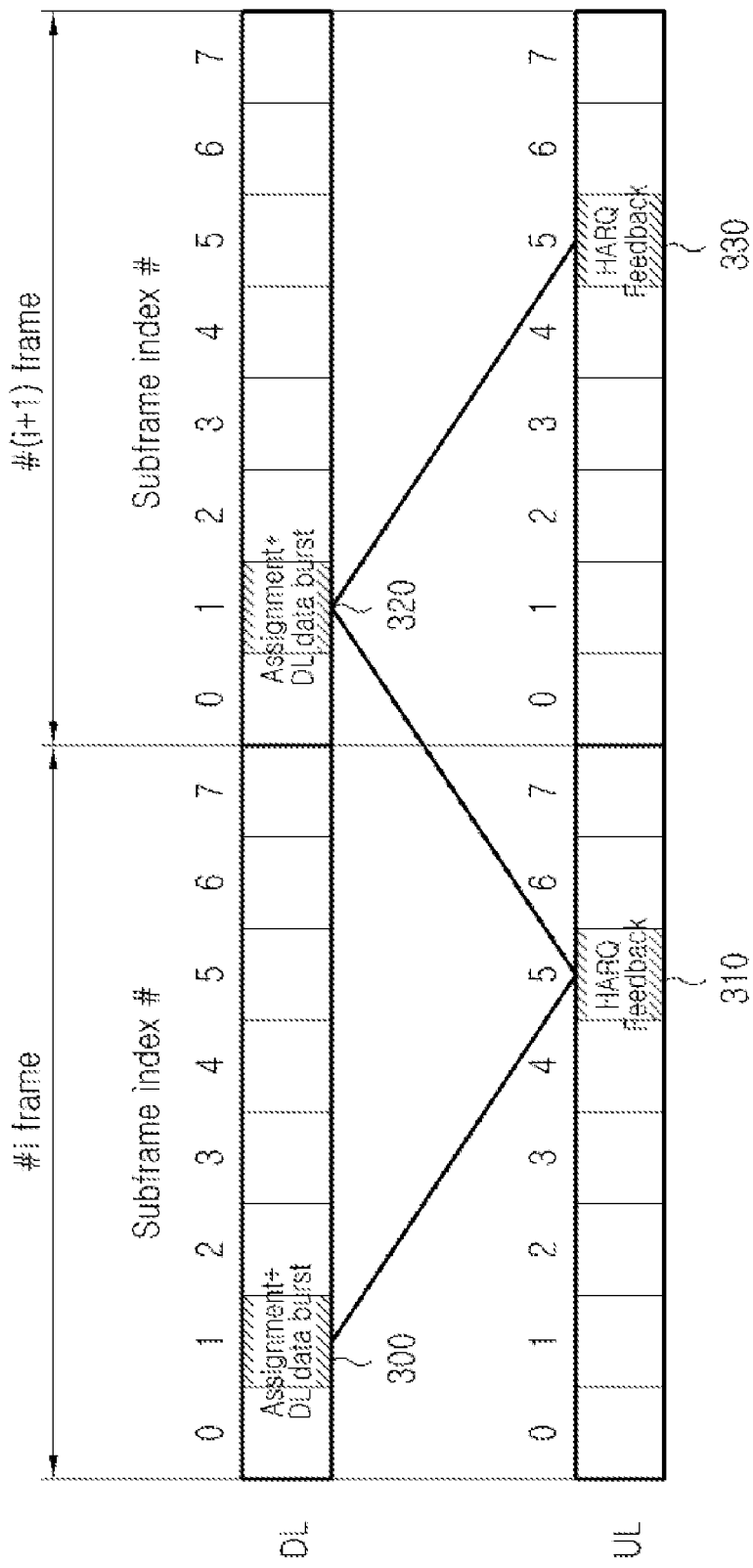
FIG. 3 is a diagram illustrating a Hybrid Automatic Repeat reQuest (HARQ) operation timing structure for DownLink (DL) data burst transmission in FDD according to an exemplary embodiment of the present invention.

FIG. 3 is a diagram illustrating an HARQ operation timing structure for DL data burst transmission in FDD according to an exemplary embodiment of the present invention. As illustrated in FIG. 3, the HARQ operation timing structure for DL data burst transmission in FDD is designed based on the FDD frame structure illustrated in FIG. 1. It is assumed that the number of frames per superframe, N is 4, the number of subframes per frame, F is 8, and a Transmission/Reception (Tx/Rx) processing time for a data burst is 3 subframes, a DL HARQ feedback offset z is 0, and a DL HARQ transmission offset, u is 0. The Tx processing time is defined as the time required for transmitting the next data after receiving an HARQ feedback at the transmitter, and the Rx processing time is defined as the time required for transmitting an HARQ feedback after receiving data at the receiver.

Referring to FIG. 3, the transmitter transmits data burst assignment information and a DL data burst in a #1 DL subbframe (i.e., $1^{th}$ DL subframe) 300 of a #i frame (i.e., $i^{th}$ frame) in a DL frequency band. Then the receiver transmits an HARQ feedback for the DL data burst in a #5 UL subframe 310 of the #i frame in a UL frequency band. The transmitter retransmits the data burst in a #1 DL subbframe 320 of a #(i+1) frame in the DL frequency band if the HARQ feedback is a NACK signal. For the retransmitted data burst, the receiver transmits an HARQ feedback in a #5 UL subframe 330 of the #(i+1) frame in the UL frequency band.

To describe the above HARQ operation referring to Table 1 below, the index of a subframe carrying an HARQ feedback, n is 5 and is determined by computing {ceil(1+4)mod 8}, the index of a frame carrying the HARQ feedback, j is i and is determined by computing {i+floor(ceil(1+4)/8)+0} mod 4, and the index of a frame carrying a retransmission HARQ data burst, k is i+1 and is determined by computing {j+floor((5+4)/8)+0} mod 4. "ceil" is a function of rounding an argument up to the closest integer greater than or equal to the argument, and "floor" is a function of rounding an argument down to the closest integer smaller than or equal to the argument.

Table 1 tabulates the FDD DL HARQ operation timing structure according to an exemplary embodiment of the present invention. Table 1 may be used to determine the transmission time of at least one of an assignment A-MAP with data burst assignment information, an HARQ subpacket carrying a data burst, an HARQ feedback (ACK or NACK), and an HARQ retransmission subpacket. However, it is to be understood that Table 1 should not be construed as limiting the present invention.

TABLE 1

| Content | Subframe index | Frame index |
|---|---|---|
| Assignment A-MAP IE Tx in DL | 1 | i |
| HARQ Subpacket Tx in DL | $m \in \{1, \ldots, 1 + N_{A\text{-}MAP} - 1\}$ | i |
| HARQ feedback in UL | $n = \text{ceil}(m + F/2) \bmod F$ | $j = \left(i + \text{floor}\left(\frac{\text{ceil}(m + F/2)}{F}\right) + z\right) \bmod N$ |
| HARQ subpacket ReTx in DL (in case of Selective HARQ (SHARQ)) | m | $k = \left(j + \text{floor}\left(\frac{n + F/2}{F}\right) + u\right) \bmod N$ |

In Table 1, N denotes the number of frames per superframe. If each superframe includes four subframes, N is 4. F denotes the number of subframes per frame. For instance, N=4 and F=8 in the case of bandwidths of 5, 10 and 20 MHz. i, j and k denote DL or UL frame indexes. l denotes the index of a DL subframe carrying data burst assignment information, m denotes the index of a DL subframe carrying an initial transmission data burst, and n denotes the index of a UL subframe carrying an HARQ feedback for the received data burst. In addition, z denotes a DL HARQ feedback offset and u denotes a DL HARQ Tx offset. Both z and u are represented as the number of frames. Therefore, i=0, 1, . . . , N-1, j=0, 1, . . . , N-1, l=0, $N_{A-MAP}$, . . . , $N_{A-MAP}$·(ceil(F/$N_{A-MAP}$)-1), n=0, 1, . . . , F-1, m=0, 1, . . . , F-1 z=0, 1, . . . , $z_{max}$-1, u=0, 1, . . . , $u_{max}$-1.

$N_{A-MAP}$ denotes the period of transmitting data burst assignment information, expressed as the number of subframes. The data burst assignment information is delivered in a typical MAP message or an A-MAP message. If the data burst assignment information is transmitted in every DL subframe, $N_{A-MAP}$ is 1. If the data burst assignment information is transmitted in every other DL subframe, $N_{A-MAP}$ is 2. In this case, l=0, 2, . . . , 2(ceil(F/2)-1).

For the FDD DL HARQ transmission and reception illustrated in FIG. 3, F=8, N=4, z=0 and u=0. DL data burst assignment information transmitted in the #l DL subframe 300 of the #i frame indicates the #m DL subframe of the #i frame. When data burst assignment information is transmitted in every DL subframe (i.e., $N_{A-MAP}$=1), the data burst assignment information indicates a data burst transmission that starts in the DL subframe. That is, m=l. On the other hand, When data burst assignment information is transmitted in every other DL subframe (i.e., $N_{A-MAP}$=2), data burst assignment information in the #l DL subbframe indicates a data burst transmission that starts in the #l or #(l+1) DL subframe. That is, m is l or (l+1). Relevance information indicating l or (l+1) is included in the data burst assignment information.

A data burst indicated by data burst assignment information may occupy one or more DL subframes. The Transmission Time Interval (TTI) of a data burst starting in the #m DL subframe is denoted by $N_{TTI}$. That is, $N_{TTI}$ denotes the number of subframes which the data burst spans. For example, $N_{TTI}$ may be preset or signaled by the data burst assignment information. If the data burst spans one subframe, $N_{TTI}$=1 and if the data burst spans four subframes, $N_{TTI}$=4.

An HARQ feedback for a data burst whose transmission starts in the #m DL subframe of the #i frame is transmitted in the #n UL subframe of the #j frame. According to the index of the subframe carrying the data burst, m, n is given as:

$$n = \text{ceil}(m+F/2) \bmod F \quad (1)$$

The index of the UL frame carrying the HARQ feedback, j is determined according to the subframe index m and frame index i of the data burst. A frame offset is created by the time gap between completion of the data burst transmission and the transmission time of the HARQ feedback. The time gap denoted as Gap1 is computed by:

$$\text{Gap1} = \text{ceil}(F/2) - N_{TTI} \quad (2)$$

where $N_{TTI}$ denotes the TTI of the data burst in the DL HARQ operation, expressed as the number of subframes, and F denotes the number of subframes per frame.

Because link periods are successive in the FDD system, Gap1 is determined according to the TTI of a DL burst and the number of subframes per frame, irrespective of subframe indexes.

In DL HARQ, the DL HARQ feedback offset z is set in such a manner that Gap1 described as equation (2) is equal to or greater than an Rx processing time. For example, if Gap1 is equal to or greater than the Rx processing time, z=0, whereas if Gap1 is smaller than the Rx processing time, z=1. The value of z is adjusted so that an HARQ feedback is transmitted in a subframe with the same index in a delayed frame. Actually, z is an offset expressed as the number of frames, which does not mean that the index of a subframe carrying an HARQ feedback is changed.

Once z is determined in this manner, j is:

$$j = \left(i + \text{floor}\left(\frac{\text{ceil}(m+F/2)}{F}\right) + z\right) \bmod N \quad (3)$$

When the DL data burst is retransmitted in asynchronous HARQ, the retransmission time of the DL data burst is indicated by a retransmission indicator included in data burst assignment information. Meanwhile, if the DL data burst is retransmitted in synchronous HARQ, the retransmission takes place in the #m subframe of a #k frame. Referring to Table 1, the frame index k is determined based on the index j of the frame carrying the HARQ feedback and the index m of a subframe carrying the retransmission data burst is the same as the index of the subframe of a previous transmission of the transmission data burst. A frame offset is generated by the time gap between the transmission time of the HARQ feedback and the retransmission time of the data burst. The time gap denoted as Gap2 is given by:

$$\text{Gap2} = \text{floor}(F/2) - N_{CTRL,TTI} \quad (4)$$

where $N_{CTRL,TTI}$ denotes the TTI of the HARQ feedback in the DL HARQ operation, and F denotes the number of subframes per frame. Because link periods are successive in the FDD system, Gap2 is determined according to the TTI of a UL feedback and the number of subframes per frame, irrespective of subframe indexes. An HARQ feedback usually spans one subframe.

In DL HARQ, the DL HARQ Tx offset u is set in such a manner that Gap2 described as equation (4) is equal to or greater than a Tx processing time. For example, if Gap2 is equal to or greater than the Tx processing time, u=0, whereas if Gap2 is smaller than the Tx processing time, u=1. The value of u is adjusted so that the next HARQ data is transmitted in a delayed frame. Actually, u is an offset expressed as the number of frames, which does not mean that the index of a subframe carrying HARQ data is changed.

Once u is decided in this manner, k is:

$$k = \left(j + \text{floor}\left(\frac{m+F/2}{F}\right) + u\right) \bmod N \quad (5)$$

As described above, if the time required for processing a transmission signal is not secured, the HARQ retransmission time may be delayed by one frame (i.e., u=1). Herein, the phrase 'time is sufficient' denotes that the time required for processing signal transmission (the Tx processing time) and the time required for processing signal reception (the Rx processing time) exceed a known reference value. The reference value is initially set or broadcast by the system.

If the frame indexes j and k are equal to or larger than the number of frames per superframe, N, the index of a superframe, is increased by 1 and the frame indexes j and k are values obtained by computing the modulo formulas of equation (3) and equation (5). Referring to FIGS. 1 and 2, it may be considered that N=4.

Referring to equation (2) and equation (4), the DL HARQ feedback offset z and the DL HARQ Tx offset u may be determined according to the TTI of an HARQ operation (the TTI of a data burst or feedback) and the signal processing capability of the system (the transmitter and the receiver) in FDD. Information about the signal processing capability may be preset or broadcast by the system. It may be further contemplated as another exemplary embodiment that z and u are broadcast in system configuration information according to a system operation scheme.

Figure 4:
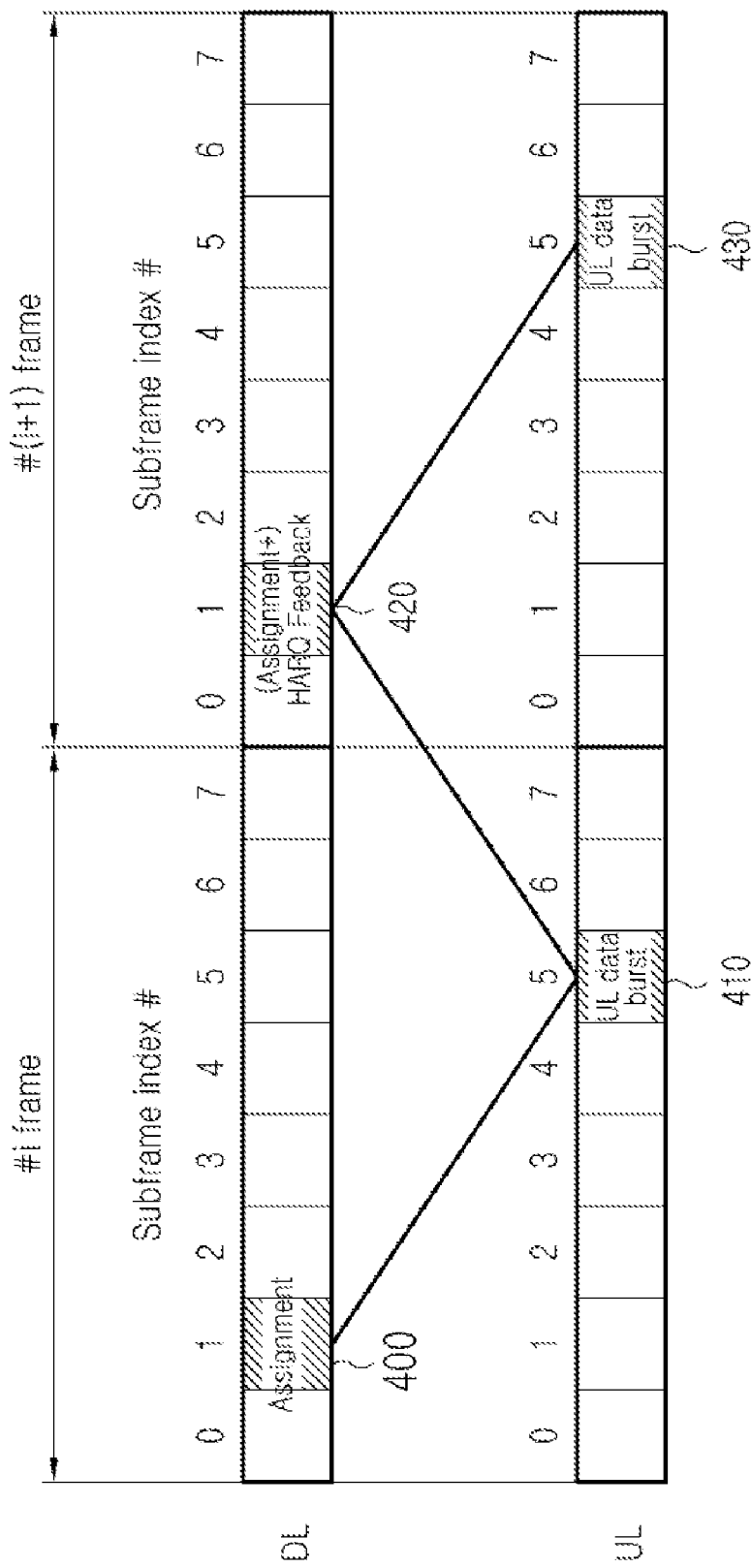
FIG. 4 is a diagram illustrating an HARQ operation timing structure for UpLink (UL) data burst transmission in FDD according to an exemplary embodiment of the present invention.

FIG. 4 is a diagram illustrating an HARQ operation timing structure for UL data burst transmission in FDD according to an exemplary embodiment of the present invention. Assuming that the number of frames per superframe, N is 4, the number of subframes per frame, F is 8, and a Tx/Rx processing time is 3 subframes, a UL HARQ feedback offset w is 0 and a UL HARQ Tx offset v is 0.

Referring to FIG. 4, upon receipt of data burst assignment information in a #1 DL subbframe 400 of a #i frame in a DL frequency band, a transmitter transmits a UL data burst in a #5 UL subframe 410 of the #i frame in a UL frequency band. A receiver transmits an HARQ feedback in a #1 DL subbframe 420 of a #(i+1) frame in the DL frequency band, according to whether the received data burst has an error. If the HARQ feedback is a NACK signal, the transmitter retransmits the data burst in a #5 UL subframe 430 of the #(i+1) frame in the UL frequency band. If the DL subframe 420 carries data burst assignment information indicating a UL burst retransmission, the UL data burst retransmission is carried out according to the data burst assignment information.

To describe the above HARQ operation referring to Table 2 below, the index of a frame carrying the UL data burst, j is i and is determined by computing {i+floor(ceil(1+4)/8)+0} mod 4, the index of a subframe carrying the UL data burst, m is 5 and is determined by computing {ceil(1+4)mod 8}, and the index of a frame carrying the HARQ feedback, k is i(j=i)+1 and is determined by computing {j+floor((5+4)/8)+ 0} mod 4. The index of a subframe carrying the HARQ feedback is 1. If the HARQ feedback is a NACK signal, the index of a frame carrying a retransmission HARQ data burst is i+1 and is determined by computing (k+floor(ceil(1+4)/8)+ 0)mod 4 and the index of a subframe carrying the retransmission HARQ data burst, m is 5. Table 2 tabulates the FDD UL HARQ operation timing structure according to an exemplary embodiment of the present invention. Table 2 may be used to determine the transmission time of at least one of an assignment A-MAP with data burst assignment information, an HARQ subpacket carrying a data burst, an HARQ feedback (ACK or NACK), and an HARQ retransmission subpacket. However, it is to be understood that Table 2 should not be construed as limiting the present invention.

In Table 2, N denotes the number of frames per superframe. If each superframe includes four subframes, N is 4. F denotes the number of subframes per frame. i, j, k and p denote DL or UL frame indexes. l denotes the index of a DL subframe carrying data burst assignment information, m denotes the index of a UL subframe in which a data burst starts to be transmitted, w denotes a UL HARQ feedback offset, and v denotes a UL HARQ Tx offset. Both w and v are represented as the number of frames. Therefore, i=0, 1, . . . , N−1, j=0, 1, . . . , N−1, k=0, 1, . . . , N−1, p=0, 1, . . . , N−1, l=0, $N_{A\text{-}MAP}$, . . . , $N_{A\text{-}MAP}\cdot(\text{ceil}(F/N_{A\text{-}MAP})-1)$, m=0, 1, . . . , F−1, n=0, 1, . . . , F−1, w=0, 1, . . . , $w_{max}-1$, and v=0, 1, . . . , $v_{max}-1$.

$N_{A\text{-}MAP}$ denotes the period of transmitting data burst assignment information, expressed as the number of subframes. If the data burst assignment information is transmitted in every DL subframe, $N_{A\text{-}MAP}$ is 1. If the data burst assignment information is transmitted in every other DL subframe, $N_{A\text{-}MAP}$ is 2. In this case, l=0, 2, . . . , 2(ceil(F/2)−1).

In FDD UL HARQ transmission and reception, UL data burst assignment information transmitted in a #1 DL subbframe of a #i frame indicates a data burst transmission that starts in a #m UL subframe of a #j frame. When data burst assignment information is transmitted in every DL subframe (i.e., $N_{A\text{-}MAP}=1$), the data burst assignment information indicates a data burst transmission that starts in a #n UL subframe. That is, m=n. On the other hand, when data burst assignment information is transmitted in every other DL subframe (i.e., $N_{A\text{-}MAP}=2$), the data burst assignment information in the #1 DL subbframe indicates a data burst transmission that starts in the #n or #(n+1) UL subframe. That is, m is n or (n+1). Relevance information indicating n or (n+1) is included in data burst assignment information. Herein, n is given as n=ceil(l+F/2)mod F.

A data burst indicated by data burst assignment information may occupy one or more UL subframes. The TTI of the data burst is denoted by $N_{TTI}$. $N_{TTI}$ is signaled by the data burst assignment information.

An HARQ feedback for the data burst whose transmission starts in the #m UL subframe of the #j frame is transmitted in a #1 DL subbframe of a #k frame. That is, the data burst assignment information and the HARQ feedback are transmitted in subframes with the same index. According to the subframe and frame indexes m and j, the frame index k is determined as described in Table 2.

The UL HARQ Tx offset v and the UL HARQ feedback offset w described in Table 2 may be calculated by equation (2) and equation (4). The UL HARQ Tx offset v is considered for burst transmission or retransmission, when data burst assignment information or an HARQ feedback is received.

TABLE 2

| Content | Subframe index | Frame index |
|---|---|---|
| Assignment A-MAP IE Tx in DL | l | i |
| HARQ Subpacket Tx in UL | $m \in \{n, \ldots, n + N_{A\text{-}MAP} - 1\}$ Where $n = \text{ceil}(l + F/2) \text{mod} F$ | $j = \left(i + \text{floor}\left(\frac{\text{ceil}(l + F/2)}{F}\right) + v\right) \text{mod} N$ |
| HARQ feedback in DL | l | $k = \left(j + \text{floor}\left(\frac{m + F/2}{F}\right) + w\right) \text{mod} N$ |
| HARQ subpacket ReTx in UL | m | $p = \left(k + \text{floor}\left(\frac{\text{ceil}(l + F/2)}{F}\right) + v\right) \text{mod} N$ |

When a UL data burst is retransmitted in asynchronous HARQ, the retransmission time of the UL data burst is indicated by the position of the data burst assignment information and a retransmission indicator included in the data burst assignment information. Meanwhile, if a UL data burst is retransmitted in synchronous HARQ, the retransmission takes place in the #m subframe of a #p frame. Referring to Table 2, the frame index p is determined according to the subframe and frame indexes l and k.

The UL HARQ Tx offset v denotes the time interval between the transmission time of DL burst assignment information or a DL HARQ feedback and the transmission time of a UL data burst, expressed as the number of frames. The UL HARQ Tx offset v is determined taking into account Gap1' that is calculated by substituting the TTI of the data burst assignment information or HARQ feedback into the TTI of a DL data burst, $N_{TTI}$ in equation (2). In general, the data burst assignment information or HARQ feedback spans one subframe.

In UL HARQ, the UL HARQ Tx offset v is set in such a manner that Gap1' is equal to or greater than a Tx processing time. For example, if Gap1' is equal to or greater than the Tx processing time, v=0, whereas if Gap1' is smaller than the Tx processing time, v=1.

The UL HARQ feedback offset w denotes the time interval between completion of a UL data burst transmission and the transmission time of a DL HARQ feedback for the UL data burst, expressed as the number of frames. The UL HARQ feedback offset w is determined taking into account Gap2' that is calculated by substituting the TTI of the UL data burst into the TTI of an HARQ feedback for a DL HARQ operation in equation (4).

In UL HARQ, w is set such that Gap2' is equal to or greater than an Rx processing time. For example, if Gap2' is equal to or greater than the Rx processing time, w=0, whereas if Gap2' is smaller than the Rx processing time, w=1.

As described above, the UL HARQ Tx offset v and the UL HARQ feedback offset w are determined according to the TTI of an HARQ operation (the TTI of a data burst or feedback) and the signal processing capability of the system (the transmitter and the receiver) in FDD. Information about the signal processing capability may be preset or broadcast by the system. It may be further contemplated as another exemplary embodiment that predefined values are broadcast as w and v in system configuration information according to a system operation scheme. If the frame indexes j, k and p are equal to or greater than N in Table 2, the superframe index s is incremented by 1 and the frame indexes j, k and p are values obtained by computing the modulo formulas described in Table 2.

In TDD mode, each frame includes DL subframes and UL subframes. In accordance with an exemplary embodiment of the present invention, a link with more subframes is divided based on a link with fewer subframes to thereby map DL subframes to UL subframes in a certain rule. Each of the areas resulting from the link division includes one or more subframes and is mapped to one subframe of the link with fewer subframes. That is, M subframes are divided into N areas (M>N), each subframe being in a predefined mapping relationship according to an exemplary embodiment of the present invention. The mapping relationship will be described further below.

Figure 5:
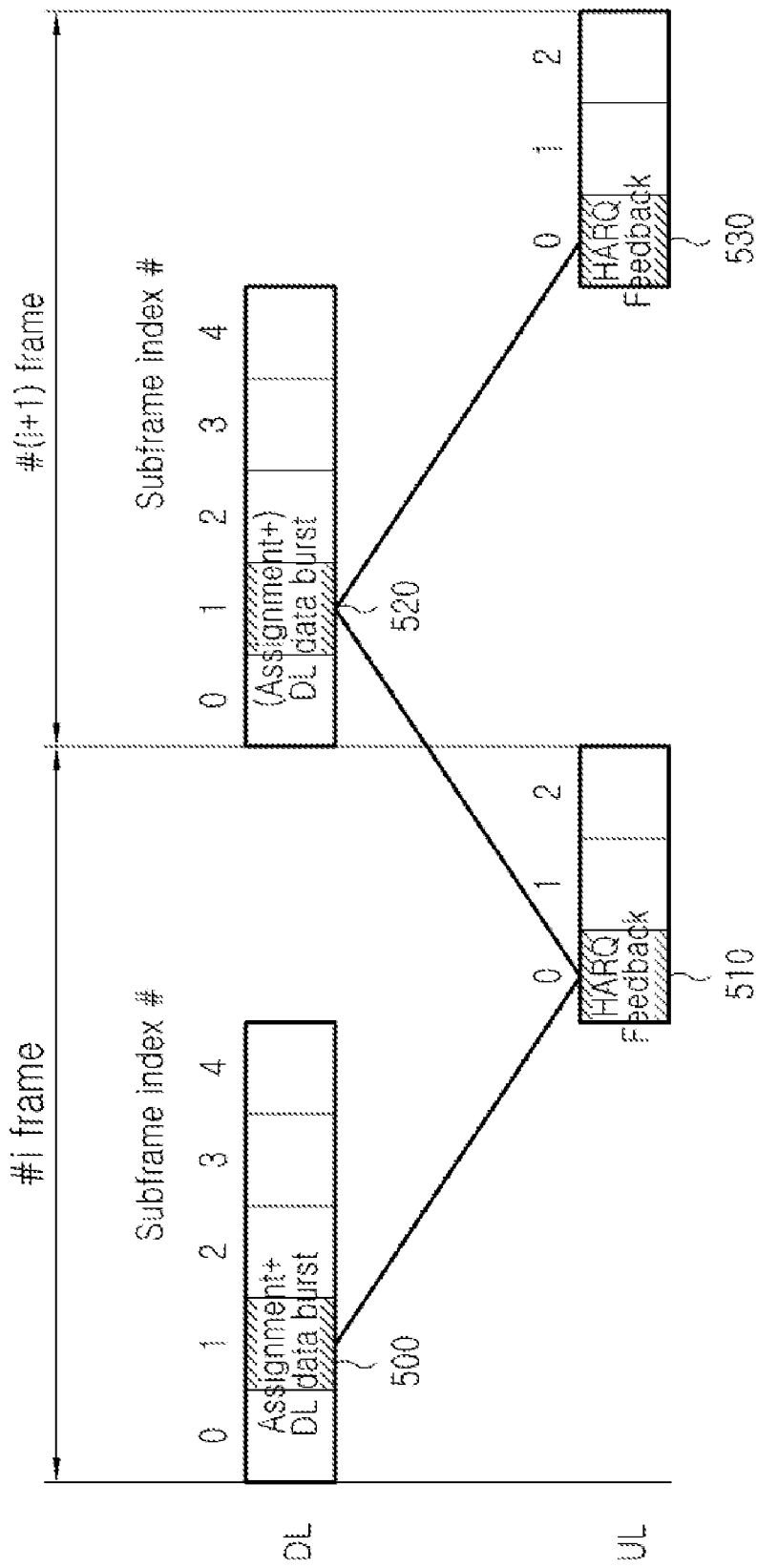
FIG. 5 is a diagram illustrating an HARQ operation timing structure for DL data burst transmission in TDD according to an exemplary embodiment of the present invention.

FIG. 5 is a diagram illustrating a DL HARQ operation timing structure for a 5:3 TDD mode according to an exemplary embodiment of the present invention. The DL HARQ operation timing structure is configured based on the TDD frame structure illustrated in FIG. 2.

Referring to FIG. 5, a transmitter transmits data burst assignment information and a DL data burst in a #1 DL subbframe 500 of a #i frame. Then a receiver transmits an HARQ feedback for the DL data burst in a #0 UL subframe 510 of the #i frame. The transmitter retransmits the data burst in a #1 DL subbframe 520 of a #(i+1) frame, if the HARQ feedback is a NACK signal. In the #1 DL subbframe 520, data burst assignment information indicating a DL data burst transmission may also be transmitted. For the retransmitted data burst, the receiver transmits an HARQ feedback in a #0 UL subframe 530 of the #(i+1) frame.

While it has been described above that DL subframes and UL subframes are separately indexed in the DL and UL periods, respectively, the DL and UL subframes may be indexed consecutively in a frame. In this case, a UL subframe index x is replaced with a subframe index D+x in a frame. D denotes the duration of the DL period.

The above HARQ operation will be described below with reference to Table 3. Table 3 illustrates a DL HARQ operation timing structure for a DL:UL=D:U mode according to an exemplary embodiment of the present invention. D denotes the duration of the DL period (i.e., the number of DL subframes) and U denotes the duration of the UL period (i.e., the number of UL subframes). Table 3 may be used to determine the transmission time of at least one of an assignment A-MAP IE with data burst assignment information, an HARQ subpacket carrying a data burst, an HARQ feedback (ACK or NACK), and an HARQ retransmission subpacket. However, it is to be understood that Table 3 should not be construed as limiting the present invention.

TABLE 3

| Content | Subframe index | Frame index |
| --- | --- | --- |
| Assignment A-MAP IE Tx in DL | l | i |
| HARQ Subpacket Tx in DL | $m \in \{l, \ldots, l + N_{A-MAP} - 1\}$ | i |
| HARQ feedback in UL | For $D > U$, $n = \begin{cases} 0, & \text{for } 0 \leq m < K \\ m - K, & \text{for } K \leq m < U + K \\ U - 1, & \text{for } U + K \leq m < D \end{cases}$ For $D \leq U$, $n = m - K$ | $j = (i + z)$ mod N |
| HARQ subpacket ReTx in DL | l | $k = (j + 1 + u)$ mod N |

In Table 3, D denotes the number of DL subframes per DL frame, U denotes the number of UL subframes per UL frame, and N denotes the number of frames per superframe. If each superframe includes four subframes, N is 4. F denotes the number of subframes per frame and thus F=D+U. i, j and k denote frame indexes. l denotes the index of a DL subframe carrying data burst assignment information, m denotes the index of a subframe in which a DL data burst transmission starts, and n denotes the index of a subframe carrying an HARQ feedback for the DL data burst. In addition, z denotes a DL HARQ feedback offset and u denotes a DL HARQ Tx offset. Therefore, j=0, 1, . . . , N−1, k=0, 1, . . . , N−1, l=0, $N_{A-MAP}, \ldots, N_{A-MAP} \cdot (\text{ceil}(D/N_{A-MAP})-1)$, m=0, 1, . . . , D−1, n=0, 1, . . . , U−1, z=0, 1, . . . , $z_{max}$−1, and n=0, 1, . . . , $u_{max}$−1.

$N_{A-MAP}$ denotes the period of transmitting data burst assignment information. If the data burst assignment information is transmitted in every DL subframe, $N_{A-MAP}$ is 1 and l ranges from 0 to D−1. If the data burst assignment information is transmitted in every other DL subframe, $N_{A-MAP}$ is 2. In this case, l=0, 2, ..., 2(ceil(D/2)−1).

A parameter K is defined according to the relationship between D and U. For example, K is defined as equation (6) or equation (7). Depending on a system bandwidth considered in the system, a processing period, and the transmission period $N_{A-MAP}$ of data burst assignment information, K may become $K_c$ or $K_f$. $K_c$ means a value calculated by using a ceiling function, ceil( ), and $K_f$ means a value calculated by using a floor function, floor( ). How to decide K depends on system configuration. Although K is generally $K_f$, $K_c$ may be used under the condition that F is an odd number and D<U/$N_{A-MAP}$.

$$K_c = \begin{cases} \text{ceil}\left(\frac{D-U}{2}\right) \text{ for } D \geq U \\ -\text{ceil}\left(\frac{U-D}{2}\right) \text{ for } D < U \end{cases} \quad (6)$$

$$K_f = \begin{cases} \text{floor}\left(\frac{D-U}{2}\right) \text{ for } D \geq U \\ -\text{floor}\left(\frac{U-D}{2}\right) \text{ for } D < U \end{cases} \quad (7)$$

If D is equal to or larger than U, $K_c$ and $K_f$ are 0s or positive values and otherwise, they are negative values.

When F is an even number, the ceil( ) and floor( ) functions operate in the same manner and thus $K_c$ and $K_f$ are identical. According to another embodiment, K may be set as follows. If D<U, K=−ceil{(U−D)/2} and if D≧U, K=floor{(D−U)/2}.

In TDD DL HARQ transmission and reception, DL data burst assignment information transmitted in a #1 DL subbframe of a #i frame indicates a data burst transmission starting in a #m DL subframe of the #i frame. When data burst assignment information is transmitted in every DL subframe (i.e., $N_{A-MAP}$=1), the data burst assignment information indicates a data burst transmission that starts in the DL subframe. That is, m=1. On the other hand, when data burst assignment information is transmitted in every other DL subframe (i.e., $N_{A-MAP}$=2), the data burst assignment information in the #1 DL subbframe indicates a data burst transmission that starts in the #1 or #(l+1) DL subframe. That is, m is l or (l+1). Relevance information indicating l or (l+1) is included in the data burst assignment information.

A data burst indicated by data burst assignment information may occupy one or more DL subframes.

An HARQ feedback for the data burst whose transmission starts in the #m DL subframe of the #i frame is transmitted in a #n UL subframe of a #j frame. According to the DL:UL (D:U) ratio, n may be mapped to one or more DL subframe indexes. If D≦U, each UL subframe is mapped to one DL subframe. On the other hand, if D>U, each UL subframe is mapped to one or more DL subframes. As defined in Table 3, the subframe index n is determined according to K and m, and the frame index j is determined according to i and z. That is, Table 3 defines a certain mapping relationship between DL subframe indexes and UL subframe indexes in one frame according to a DL:UL ratio. Table 1 shows that a case of D=U is included in a case of D<=U. In another embodiment, the case of D=U may be included in the case of D<=U as well as a case of D>=U because K is equal to zero in the case of D=U. This document explains that the HARQ timing in the case of D=U is included in the case D<=U.

As described above with reference to the FDD DL HARQ timing structure of Table 1, z denotes the DL HARQ feedback offset. To spare a sufficient Rx processing time, z is used to adjust the index of a frame carrying an HARQ feedback. Because a DL subframe alternates with a UL subframe in a frame along a time axis, Gap3, which is calculated by equation (8). is used to determine the DL HARQ feedback offset z.

$$\text{Gap 3} = M_{DATA} - a - N_{TTI} + b \quad (8)$$

where $M_{DATA}$ denotes the number of subframes carrying a data burst, a denotes the index of a subframe in which a data burst transmission starts, $N_{TTI}$ denotes the TTI of the data burst, and b denotes the index of a subframe carrying an HARQ feedback for the data burst. Accordingly, $M_{DATA}$=D, a=m, and b=n referring to Table 3.

In TDD DL HARQ, the DL HARQ feedback offset z is adjusted in such a manner that Gap3, which is described in equation (8), is equal to or greater than an Rx processing time. For example, if Gap3 is equal to or greater than the Rx processing time, z=0, whereas if Gap3 is smaller than the Rx processing time, z=1.

When a DL data burst is retransmitted in asynchronous HARQ, the retransmission of the DL data burst is indicated by a retransmission indicator included in data burst assignment information. Meanwhile, if a DL data burst is retransmitted in synchronous HARQ, the retransmission takes place in a #m subframe of a #k frame. Referring to Table 3, the frame index k is determined by the index of the frame carrying the HARQ feedback and the DL HARQ Tx offset u. If data burst assignment information indicating the retransmission of the DL data burst is transmitted, the retransmission is carried out based on the data burst assignment information.

As described before with reference to the FDD DL HARQ timing structure of Table 1, u denotes the DL HARQ Tx offset, determined according to Gap4, which is calculated by equation (9). Gap4 denotes the time gap between the transmission time of an HARQ feedback and the start of a data retransmission in the TDD mode.

$$\text{Gap 4} = M_{CTRL} - b - 1 + a \quad (9)$$

where $M_{CTRL}$ denotes the number of subframes carrying HARQ feedbacks, b denotes the index of a subframe carrying an HARQ feedback, and a denotes the index of a subframe in which a data burst starts to be retransmitted after the HARQ feedback. Hence, $M_{CTRL}$=U, b=n and a=m in Table 3.

In TDD DL HARQ, the DL HARQ Tx offset u is adjusted such that Gap4, which is calculated by equation (9), is equal to or greater than a Tx processing time. For example, if Gap4 is equal to or greater than The Tx processing time, u=0. On the contrary, if Gap4 is smaller than The Tx processing time, u=1. In the case where u=1, this implies that there is no sufficient time for processing a transmission signal and thus the HARQ retransmission time is delayed by one frame.

In Table 3, the frame indexes j and k are equal to or larger than the total number N of frames per superframe, the superframe index s is incremented by 1 and the frame indexes j and k are values obtained by computing the modulo operations illustrated in Table 3.

It may be further contemplated as another exemplary embodiment of the present invention that the DL HARQ feedback offset z and the DL HARQ Tx offset u are determined according to the DL-UL subframe mapping relationship, the TTI of an HARQ operation (the TTI of a data burst or feedback), and/or the signal processing capability of the system.

Figure 6:
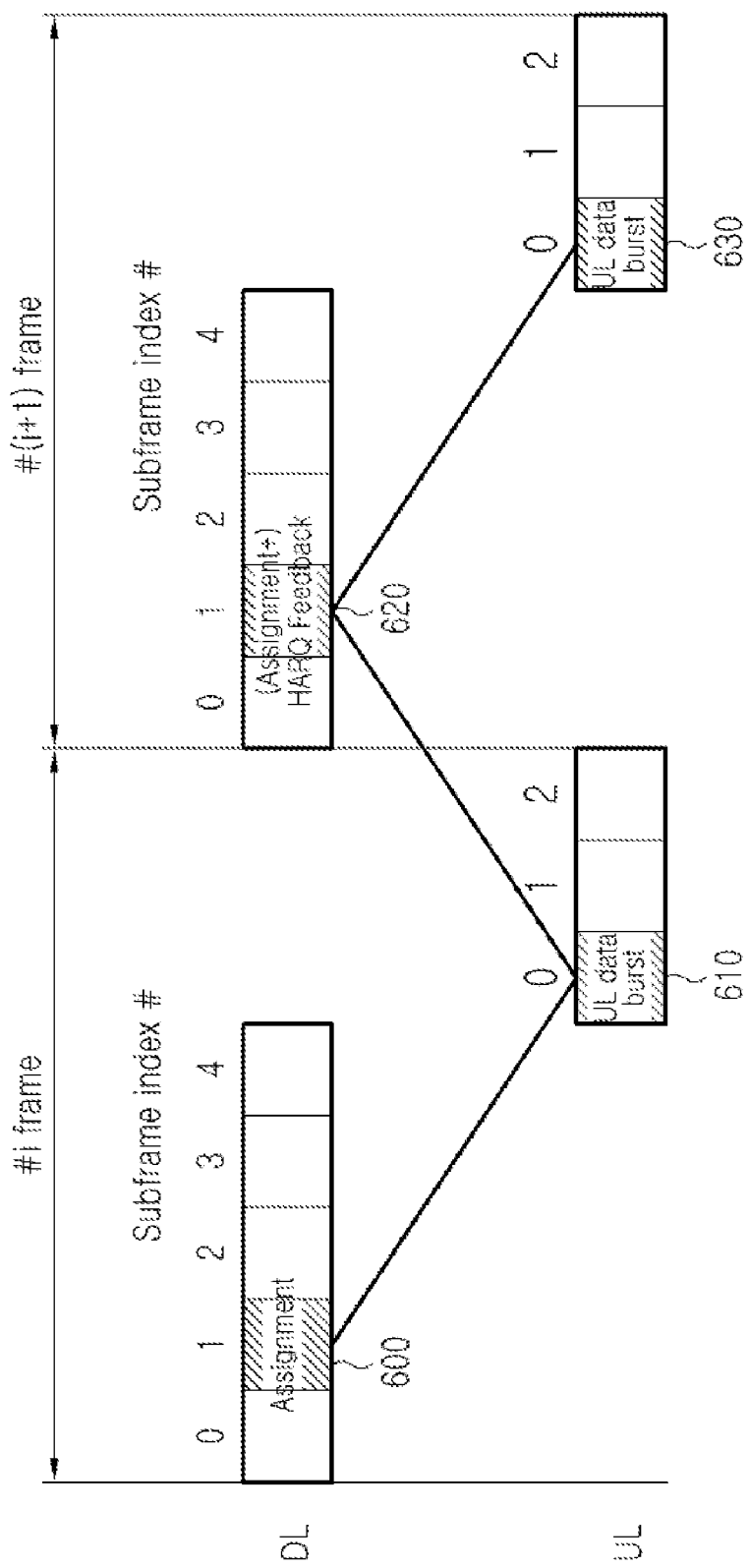
FIG. 6 is a diagram illustrating an HARQ operation timing structure for UL data burst transmission in TDD according to an exemplary embodiment of the present invention.

FIG. 6 is a diagram illustrating an HARQ operation timing structure for UL data burst transmission in TDD according to an exemplary embodiment of the present invention.

Referring to FIG. 6, upon receipt of data burst assignment information in a #1 DL subbframe 600 of a #i frame, a transmitter transmits a UL data burst in a #0 UL subframe 610 of the #i frame. A receiver transmits an HARQ feedback for the UL data burst in a #1 DL subbframe 620 of a #(i+1) frame, according to whether the received data burst has an error. If the HARQ feedback is a NACK signal, the transmitter retransmits the data burst in a #0 UL subframe 630 of the #(i+1) frame. If the DL subframe 620 carries data burst assignment information indicating a UL data burst retransmission, the UL data burst retransmission is carried out according to the data burst assignment information.

While it has been described above that DL subframes and UL subframes are separately indexed in the DL and UL periods, respectively, the DL and UL subframes may be indexed consecutively in a frame. In this case, a UL subframe index x is replaced with a subframe index D+x in a frame. D denotes the duration of the DL period.

Table 4 illustrates a UL HARQ operation timing structure in TDD mode according to an exemplary embodiment of the present invention. Table 4 may be used to determine the transmission time of at least one of an assignment A-MAP with data burst assignment information, an HARQ subpacket carrying a data burst, an HARQ feedback (ACK or NACK), and an HARQ retransmission subpacket. However, it is to be understood that Table 4 should not be construed as limiting the present invention.

mation is transmitted in every DL subframe, $N_{A-MAP}$ is 1 and l ranges from 0 to D−1. If the data burst assignment information is transmitted in every other DL subframe, $N_{A-MAP}$ is 2. In this case, $l=0, 2, \ldots, 2(\text{ceil}(D/2)-1)$.

In TDD UL HARQ transmission and reception, UL data burst assignment information transmitted in a #l DL subbframe of a #i frame indicates a data burst transmission starting in a #m UL subframe of a #j frame. According to a DL:UL (D:U) ratio and the assignment information period $N_{A-MAP}$, m may be mapped to one or more DL subframes. If ceil $(D/N_{A-MAP}) \geq U$, that is, if the number of DL subframes carrying DL control information (data burst assignment information or HARQ feedbacks) is equal to or larger than the number of UL subframes, each UL subframe is mapped to one or more DL subframes. On the other hand, if ceil $(D/N_{A-MAP}) < U$, that is, if the number of DL subframes carrying DL control information (data burst assignment information or HARQ feedbacks) is smaller than the number of UL subframes, each DL subframe is mapped to one or more UL subframes.

If the number of DL subframes carrying data burst assignment information is equal to or larger than the number of UL subframes (ceil$(D/N_{A-MAP}) \geq U$), a data burst transmission in one UL subframe may be indicated by one or more DL subframes. That is, if l is smaller than K, data burst assignment information in a #l DL subbframe indicates a data burst trans-

TABLE 4

| Content | Subframe index | Frame index |
|---|---|---|
| Assignment A-MAP IE Tx in DL | l | i |
| HARQ Subpacket Tx in UL | For ceil$(D/N_{A-MAP}) \geq U$, $m = \begin{cases} 0, & \text{for } 0 \leq l < K \\ l-K, & \text{for } K \leq l < U+K \\ U-1, & \text{for } U+K \leq l < D \end{cases}$ For $1 < \text{ceil}(D/N_{A-MAP}) < U$, $m = \begin{cases} 0, \ldots, \text{ or } l-K+N_{A-MAP}-1, & \text{for } l=0 \\ l-K, \ldots, \text{ or } l-K+N_{A-MAP}-1, & \text{for } 0 < l < l_{max} \\ l-K, l-K+1, \ldots, \text{ or } U-1, & \text{for } l=l_{max} \end{cases}$ where $l_{max} = N_{A-MAP} \cdot (\text{ceil}(D/N_{A-MAP})-1)$ For ceil$(D/N_{A-MAP}) = 1$ $m = 0, 1, \ldots, \text{ or } U-1, \quad \text{for } l=0$ | $j = (i+v) \bmod N$ |
| HARQ feedback in DL | l | $k = (j+1+w) \bmod N$ |
| HARQ Subpacket ReTx in UL | m | $p = (k+v) \bmod N$ |

In Table 4, D denotes the number of DL subframes per DL frame, U denotes the number of UL subframes per UL frame, K is a parameter defined as equation (6) or equation (7), according to the relationship between D and U, and N denotes the number of frames per superframe. If each superframe includes four subframes, N is 4. i, j, k and p denote frame indexes. l denotes the index of a DL subframe carrying data burst assignment information, m denotes the index of a subframe in which a data burst transmission starts, w denotes a UL HARQ feedback offset, and v denotes a UL HARQ Tx offset. Therefore, $i=0, 1, \ldots, N-1, j=0, 1, \ldots, N-1, k=0, 1, \ldots, N-1, p=0, 1, \ldots, N-1, l=0, N_{A-MAP}, \ldots, N_{A-MAP}\cdot(\text{ceil}(D/N_{A-MAP})-1), m=0, 1, \ldots, U-1, w=0, 1, \ldots, w_{max}-1$, and $v=0, 1, \ldots, v_{max}-1$.

$N_{A-MAP}$ denotes the period of transmitting data burst assignment information. If the data burst assignment informission that starts in a #0 UL subframe. If l is equal to or larger than K, and smaller than U+K, the data burst assignment information in the #l DL subbframe indicates a data burst transmission that starts in a #(l−K) UL subframe. If l is equal to or larger than U+K, the data burst assignment information in the #l DL subbframe indicates a data burst transmission that starts in a #(U−1) UL subframe.

On the other hand, if the number of DL subframes carrying data burst assignment information is smaller than the number of UL subframes (ceil$(D/N_{A-MAP}) < U$), data burst assignment information in a DL subframe may indicate data burst transmissions in one or more UL subframes. For example, data burst assignment information in a #0 DL subframe indicates data burst transmissions in #0 to #(l−K+$N_{A-MAP}$−1) UL subframes. Relevance information regarding the indication is transmitted in data burst assignment information.

If data burst assignment information is transmitted only in one DL subframe (ceil(D/N$_{A-MAP}$)=1), the DL subframe indicates data burst transmissions in all UL subframes. The TTI of a data burst may be indicated by data burst assignment information and the frame index j is determined according to i and v.

As described above with reference to the FDD UL HARQ timing structure of Table 2, v denotes the UL HARQ Tx offset and w denotes the UL HARQ feedback offset. The UL HARQ Tx offset v is used for the transmission or retransmission time of a data burst after data burst assignment information or an HARQ feedback is received. As stated above, the UL HARQ Tx offset v is used to adjust the index of a frame carrying a data burst to secure a sufficient Tx processing time.

In TDD UL HARQ, the UL HARQ Tx offset v is determined according to Gap4' that is calculated by substituting for the number D of DL subframes carrying control information such as burst assignment information or HARQ feedbacks for M$_{CTCL}$, substituting the index l of a subframe carrying data burst assignment information or an HARQ feedback for b, and substituting the index m of a subframe carrying an initial transmission or retransmission data burst for a, in equation (9).

If Gap4' is smaller than the Tx processing time required for a data burst transmission after an HARQ feedback is received, v=1 and otherwise, v=0.

In TDD UL HARQ, to adjust the transmission time of an HARQ feedback after receiving a data burst, the UL HARQ feedback offset w is determined according to Gap3' that is calculated by substituting the number U of subframes carrying a data burst for M$_{DATA}$ in equation (8).

If Gap3' is smaller than the Rx processing time required for transmission of an HARQ feedback after a UL data burst is received, w=1 and otherwise, w=0.

An HARQ feedback for a data burst transmitted in a #m UL subframe of a #j frame is transmitted in a #l DL subbframe of a #k frame. That is, data burst assignment information and an HARQ feedback are transmitted in subframes with the same index. Herein, k is determined by j.

When a UL data burst is retransmitted in asynchronous HARQ, the retransmission time of the UL data burst is indicated by a retransmission indicator included in data burst assignment information. Meanwhile, if a UL data burst is retransmitted in synchronous HARQ, the retransmission takes place in a #m subframe of a #p frame. Referring to Table 4, the frame index p is determined by the UL HARQ Tx offset v and the index k of a frame carrying an HARQ feedback. If the frame indexes j, k and p are equal to or larger than the total number N of frames per superframe, the superframe index s is incremented by 1 and the frame indexes j, k and p are values obtained by computing the modulo operations illustrated in Table 4.

While it has been described above that the HARQ timing is determined by using the equations of Tables 1 to 4, the HARQ timing may be determined by storing a table having result values according to the equations of Tables 1 to 4 corresponding to all possible input values (i.e., the number of DL/UL subframes, a subframe index, and a processing time and so on) into a transmitter and a receiver, and reading a desired result values form the table.

Calculation of HARQ Feedback and Tx Offsets

Exemplary embodiments of calculating the HARQ feedback offsets w and z and the HARQ Tx offsets v and u will be described below.

The HARQ feedback offsets w and z and the HARQ Tx offsets v and u may be determined according to the mapping relationship between DL subframes and UL subframes, the TTI of an HARQ operation (the TTI of a data burst or feedback), and/or the signal processing capability of the system (the transmitter and/or receiver). In another exemplary embodiment of the present invention, the HARQ feedback offsets may be preset and broadcast by the system, rather than being are calculated using the above information. The HARQ operation-related offsets are defined as follows.

At least one of the HARQ feedback offset z and the HARQ Tx offset u for an FDD DL HARQ operation is calculated by:

$$z = \begin{cases} 0, & \text{for ceil}(F/2) - N_{TTI} \geq \text{Rx\_Time 1} \\ 1, & \text{for ceil}(F/2) - N_{TTI} < \text{Rx\_Time 1} \end{cases} \quad (10)$$

$$u = \begin{cases} 0, & \text{for floor}(F/2) - 1 \geq \text{Tx\_Time 1} \\ 1, & \text{for floor}(F/2) - 1 < \text{Tx\_Time 1} \end{cases}$$

where Rx_Time1 denotes the Rx processing time of a DL data burst, determined by the processing capability of the receiver, and Tx_Time1 denotes the Tx processing time of a DL data burst, determined by the processing capability of the transmitter. Rx_Time1 and Tx_Time1 may be collectively referred to as the processing time of a data burst. The Rx processing of a data burst includes, for example, Multiple Input Multiple Output (MIMO) Rx processing, demodulation, and decoding. The Tx processing of a data burst includes, for example, encoding, modulation, and MIMO Tx processing. In DL HARQ, generally the receiver is an MS and the transmitter is a BS. Herein, an HARQ feedback TTI is assumed to be one subframe and a data burst transmission time interval TTI is represented as N$_{TTI}$.

At least one of the HARQ feedback offset w and the HARQ Tx offset v for an FDD UL HARQ operation is calculated by:

$$v = \begin{cases} 0, & \text{for ceil}(F/2) - 1 \geq \text{Tx\_Time 2} \\ 1, & \text{for ceil}(F/2) - 1 < \text{Tx\_Time 2} \end{cases} \quad (11)$$

$$w = \begin{cases} 0, & \text{for floor}(F/2) - N_{TTI} \geq \text{Rx\_Time 2} \\ 1, & \text{for floor}(F/2) - N_{TTI} < \text{Rx\_Time 2} \end{cases}$$

where Rx_Time2 denotes the Rx processing time of a UL data burst, determined by the processing capability of the receiver, and Tx_Time2 denotes the Tx processing time of a UL data burst, determined by the processing capability of the transmitter. Rx_Time2 and Tx_Time2 may be collectively referred to as the processing time of a data burst. In UL HARQ, generally the receiver is a BS and the transmitter is an MS.

At least one of the HARQ feedback offset z and the HARQ Tx offset u for a TDD DL HARQ operation is calculated by:

$$z = \begin{cases} 0, & \text{for } D - m - N_{TTI} + n \geq \text{Rx\_Time 3} \\ 1, & \text{for } D - m - N_{TTI} + n < \text{Rx\_Time 3} \end{cases} \quad (12)$$

$$u = \begin{cases} 0, & \text{for } U - n - 1 + m \geq \text{Tx\_Time 3} \\ 1, & \text{for } U - n - 1 + m < \text{Tx\_Time 3} \end{cases}$$

where Rx_Time3 and Tx_Time3 denote the Rx and Tx processing times of a DL data burst, respectively. Rx_Time3 and Tx_Time3 may be collectively referred to as the processing time of a data burst.

At least one of the HARQ feedback offset w and the HARQ Tx offset v for a TDD UL HARQ operation is calculated by:

$$v = \begin{cases} 0, & \text{for } D - l - 1 + m \geq \text{Tx\_Time4} \\ 1, & \text{for } D - l - 1 + m < \text{Tx\_Time4} \end{cases} \quad (13)$$

$$w = \begin{cases} 0, & \text{for } U - m - N_{TTI} + l \geq \text{Rx\_Time4} \\ 1, & \text{for } U - m - N_{TTI} + l < \text{Rx\_Time4} \end{cases}$$

where Rx_Time4 and Tx_Time4 denote the Rx and Tx processing times of a UL data burst, respectively. Rx_Time4 and Tx_Time4 may be collectively referred to as the processing time of a data burst.

In synchronous HARQ, the Tx processing time of a UL HARQ operation is different for an initial transmission and a retransmission. That is, Tx_Time2 of equation (11) and Tx_Time4 of equation (13) may be replaced with Tx_Time_NewTx and Tx_Time_ReTx depending on whether a data burst is initially transmitted or retransmitted. Tx_Time_NewTx represents the Tx processing time of an initial transmission data burst and Tx_Time_ReTx represents the Tx processing time of a retransmission data burst. As stated before, although an initial transmission data burst is encoded according to data burst assignment information, a data burst whose retransmission is triggered by a NACK signal may be encoded based on the encoded initial transmission data burst. Therefore, an HARQ Tx offset may be adjusted, considering different Tx processing times for the initial transmission and the retransmission.

According to retransmission triggering, the Tx processing time of a retransmission data burst may be Tx_Time_ReTx1 or Tx_Time_ReTx2. The retransmission triggering can be considered in two ways. In the first way, only a NACK signal is transmitted, and in the second way, both a NACK signal and assignment information for a retransmission are transmitted. Tx_Time_ReTx1 is used for the former case and Tx_Time_ReTx2 is used for the latter case.

Similarly, the UL HARQ Tx offsets described in Table 2, Table 4, equation (11), and equation (13) may be adjusted separately as $v_{new}$ and $v_{RxTx}$ according to the Tx processing time of an initial transmission or a retransmission. $v_{new}$ is a UL HARQ Tx offset for an initial transmission data burst, taking into account the Tx processing time, Tx_Time_NewTx, and $v_{RxTx}$ is a UL HARQ Tx offset for a retransmission data burst, taking into account the Tx processing time, Tx_Time_ReTx.

Legacy Supporting Mode

A wireless mobile communication system using the Institute of Electrical and Electronics Engineers (IEEE) 802.16m Advanced Air Interface (AAI) may coexist with an IEEE 802.16e legacy wireless mobile communication system, by use of a predefined frame offset in a superframe structure. Specifically, each 16m frame includes a frame offset along with DL subframes and UL subframes in order to compensate for the disparity from a 16e frame. In this case, TDD HARQ operation timing structures are configured based on the HARQ operation timing structures described in Table 3 and Table 4 according to the DL:UL ratio of a period in which a network node and an MS operate in IEEE 802.16m mode.

The DL-to-UL subframe mapping relationship is determined according to the DL:UL ratio of a period in which a network node and an MS operate in the IEEE 802.16m mode. In other words, the indexes and numbers of subframes in transmission periods for an HARQ operation are determined according to the DL:UL ratio. However, due to the coexistence of the IEEE 802.16e mode and the IEEE 802.16m mode in one frame, frames are indexed not according to the DL:UL ratio of the 16m-mode period but according to the whole DL:UL ratio of the TDD system.

Let the number of DL subframes and the number of UL subframes in the TDD system be denoted by D' and U', respectively. Subframe indexes l', m' and n' are numbered according to the DL:UL ratio of the TDD system, i.e. D':U'. Also, let the number of DL subframes and the number of UL subframes in a 16m-mode period be denoted by D and U, respectively. Then subframe indexes l', m and n are numbered according to the DL:UL ratio of the 16m-mode period, D:U.

For the 16m-mode period other than a 16e-mode legacy period, HARQ operation timings follow Table 3 and Table 4. However, the frame indexes i, j and k determined according to the HARQ feedback offset z or w and the HARQ Tx offset u or v are numbered by using subframe indexes l', m', n' according to D':U'.

Figure 7:
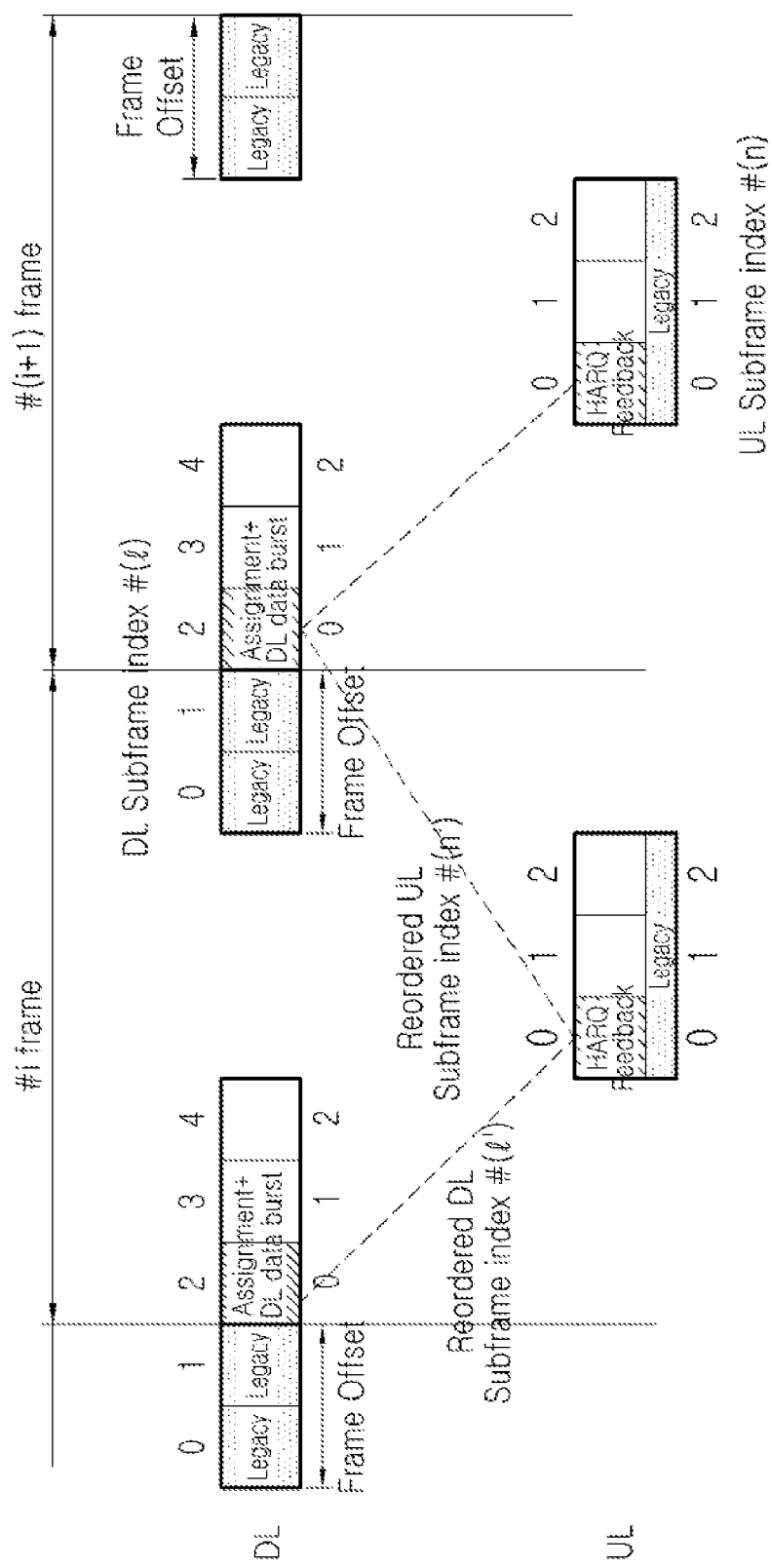
FIG. 7 is a diagram illustrating an HARQ operation timing structure for DL data burst transmission in TDD in the case where two different systems coexist according to an exemplary embodiment of the present invention.

FIG. 7 illustrates an HARQ operation timing structure for DL data burst transmission in a 5:3 TDD mode in the case where two different systems coexist according to an exemplary embodiment of the present invention.

Referring to FIG. 7, two DL subframes and a UL Frequency Division Multiplexing (FDM) region are dedicated to a mode supporting a legacy system (i.e., a legacy supporting mode) and subframes are reindexed in the remaining link periods except those for the legacy supporting mode. More specifically, there are #0 to #4 DL subframes in an entire TDD system. Therefore, the #2, #3 and #4 DL subframes are re-numbered as #0, #1 and #2, respectively, in the 16m-mode period. And an UL period coexist with an DL period by using a FDM, the 16m-mode period spans an entire UL period. Hence, a 16m-mode frame eventually includes three DL subframes and three UL subframes.

Referring to FIG. 7, since D=3 and U=3, K=0. D' is 5 and U' is 3. In a TDD DL HARQ data burst transmission, data burst assignment information and a data burst are transmitted in a #0 DL subframe of a #i frame. An HARQ feedback for the data burst is transmitted in a #0 UL subframe of the #i frame. A retransmission of the HARQ data burst takes place in a #0 DL subframe of a #(i+1) frame and an HARQ feedback for the retransmission data burst is transmitted in a #0 UL subframe of the #(i+1) frame. In the illustrated case of FIG. 7, each of the Tx and Rx processing times is considered to be two subframes.

Figure 8:
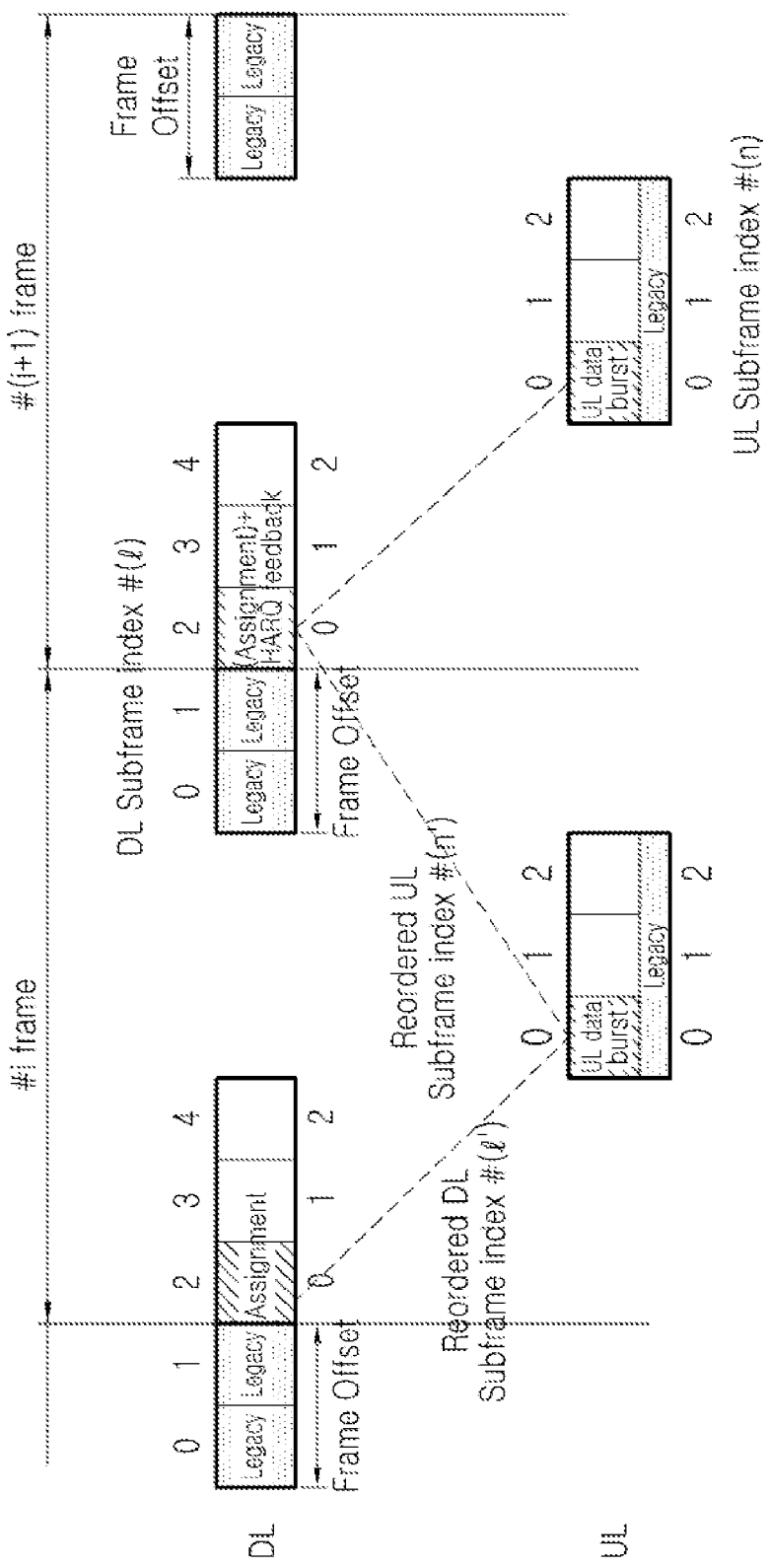
FIG. 8 is a diagram illustrating an HARQ operation timing structure for UL data burst transmission in TDD in the case where two different systems coexist according to an exemplary embodiment of the present invention.

FIG. 8 illustrates an HARQ operation timing structure for UL data burst transmission in the 5:3 TDD mode in the case where two different systems coexist according to an exemplary embodiment of the present invention.

Referring to FIG. 8, since D=3 and U=3 according to the frame structure of FIG. 7, K=0. In a TDD UL HARQ data burst transmission, data burst assignment information is transmitted in a #0 DL subframe of a #i frame and a UL data burst is transmitted in a #0 UL subframe of the #i frame according to the data burst assignment information. An HARQ feedback for the UL data burst is transmitted in a #0 DL subframe of a #(i+1) frame and a retransmission of the UL data burst takes place in a #0 UL subframe of the #(i+1) frame. In the #0 DL subframe, data burst assignment information indicating a UL data burst transmission may be transmitted. In the illustrated case of FIG. 8, each of the Tx and Rx processing times is considered to be two subframes.

Resources used in an IEEE 802.16e wireless communication system are allocated to a period corresponding to a frame offset in FIGS. 7 and 8.

The HARQ operation timing structures proposed as Table 1 to Table 4 are set according to the index of a subframe carrying data burst assignment information or the index of a subframe in which a data burst starts to be transmitted, irrespective of the TTI of the data burst. Hence, because an HARQ feedback is transmitted periodically in a predefined subframe in synchronous HARQ, the receiver saves power that might otherwise be consumed for monitoring the reception of an HARQ feedback and Co-Located Coexistence (CLC) is efficiently supported.

Long TTI

In another exemplary embodiment of the present invention, when a data burst occupies two or more subframes, that is, when a long TTI is used, an HARQ feedback timing may be determined according to the index of a subframe in which a data burst transmission ends, instead of the index of a subframe in which the data burst transmission starts, in order to support an earlier ACK timing, relative to the HARQ timing structures described in Table 1 to Table 4. This timing decision may be used for an earlier ACK timing usually in asynchronous HARQ.

The HARQ feedback timing defined in Table 1 is adjusted as follows. The indexes of a subframe and a frame that carry an HARQ feedback are determined based on the index m' ($=m+N_{TTI}-1$) of a last subframe of a TTI, instead of the index m of a first subframe of the TTI.

Figure 9:
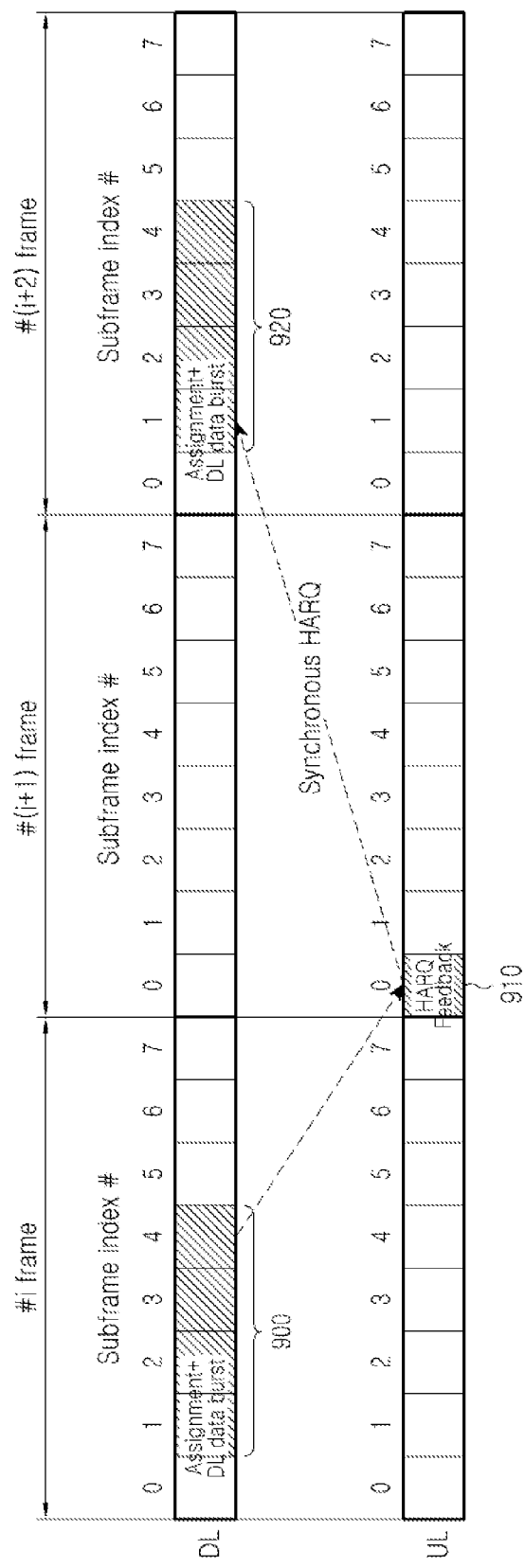
FIG. 9 is a diagram illustrating an HARQ operation timing structure for DL data burst transmission in FDD according to another exemplary embodiment of the present invention.

FIG. 9 illustrates an HARQ operation timing structure for DL data burst transmission in the FDD mode according to another exemplary embodiment of the present invention. It is assumed herein that $N_{TTI}=4$, F=8, each of the Tx and Rx processing times is three or fewer subframes, the DL HARQ feedback offset z is 0, and the DL HARQ Tx offset u is 0.

Referring to FIG. 9, data burst assignment information transmitted in a #1 DL subbframe of a #i frame indicates transmission of a data DL data burst in a TTI 900 of the #1 to #4 DL subframes in the #i frame. An HARQ feedback for the DL data burst is transmitted in a #0 UL subframe 910 of a #(i+1) frame mapped to the fourth DL subframe of the #i frame, in which the DL data burst transmission ends. That is, n=0 (=ceil(1+4−1+4)mod 8) and j=i+1 (=(i+floor(ceil(1+4−1+4)/8)mod 4))). In synchronous HARQ, transmission of a data burst 920 starts at the same subframe position as the previous data burst transmission, i.e. in a #1 DL subbframe of a #(i+2) frame.

As described above, the HARQ feedback timings may be determined according to the index m' of the last of one or more subframes carrying a data burst, instead of the index m of the first of the subframes, in Table 1 and Table 2.

Similarly in a DL HARQ operation timing structure in the TDD mode, an HARQ feedback timing may be determined by applying the index m' ($=m+N_{TTI}-1$) of the last subframe carrying a data burst, instead of the index m of the first subframe of the data burst to Table 3, in order to get an early ACK timing.

Figure 10:
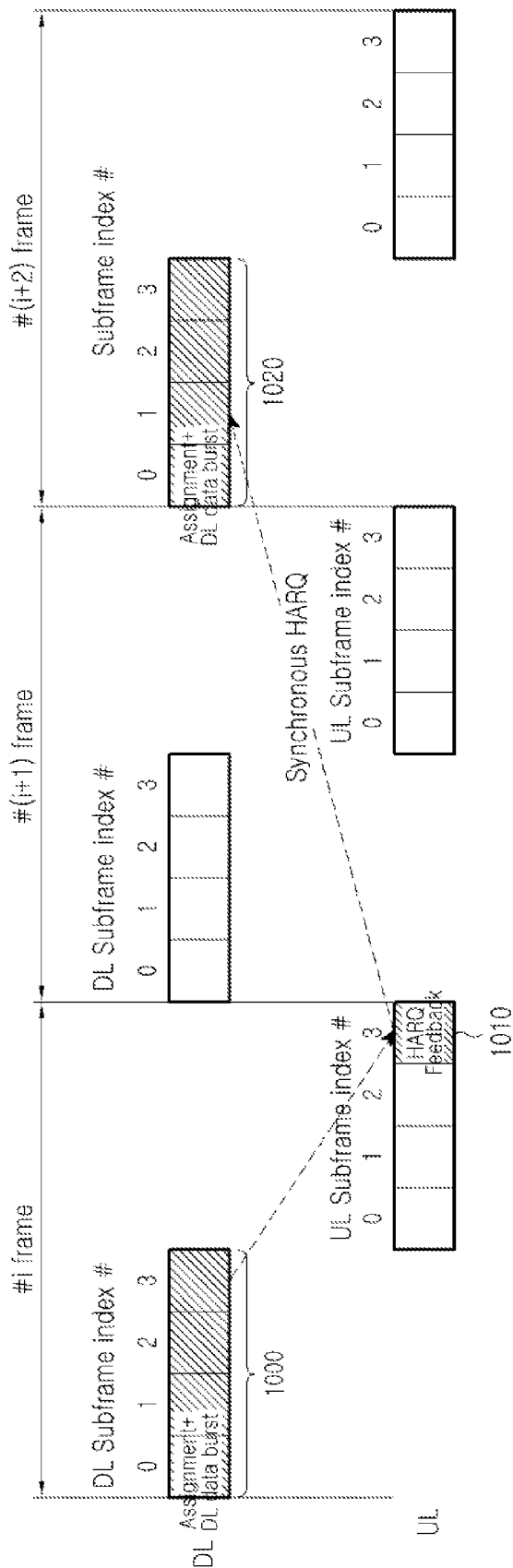
FIG. 10 is a diagram illustrating an HARQ operation timing structure for DL data burst transmission in TDD according to another exemplary embodiment of the present invention.

FIG. 10 illustrates an HARQ operation timing structure for DL data burst transmission in the TDD mode according to another exemplary embodiment of the present invention. It is assumed herein that $N_{TTI}=4$, D=4, U=4, each of the Tx and Rx processing times is three or fewer subframes, K=0, and z=0.

Referring to FIG. 10, data burst assignment information transmitted in a #0 DL subframe of a #i frame indicates transmission of a DL data burst in a TTI 1000 of #0 to #3 DL subframes in the #i frame. An HARQ feedback for the DL data burst is transmitted in a #3 UL subframe 1010 of the #i frame, mapped to the #3 DL subframe of the #i frame according to Table 3. That is, n=0 (=3−0) and j=i (=(i+0)mod 4). In synchronous HARQ, retransmission of a data burst 1020 after the HARQ feedback starts at the same subframe position as the previous data burst transmission, i.e. in a #0 DL subframe of a #(i+2) frame.

However, an HARQ feedback timing is determined differently according to a DL:UL ratio and a Tx/Rx processing time in a TDD HARQ operation timing structure for a long TTI. A description will be made of an HARQ feedback timing for a long TTI (5 subframes) in a 5:3 TDD DL HARQ operation, in the case where the Tx/Rx processing time is 3 subframes and a TTI covers the whole DL period, by way of an example.

If an HARQ feedback timing is set according to the start of a data burst transmission, an HARQ feedback for a data burst whose transmission starts in a #0 DL subframe is transmitted in a #0 UL subframe of the next frame. On the other hand, if the HARQ feedback timing is set according to the end of a data burst transmission, an HARQ feedback for a data burst whose transmission ends in a #4 DL subframe is transmitted in a #3 UL subframe of the next frame. Thus, in the case where a long TTI is used in the 5:3 TDD DL HARQ, an earlier HARQ feedback timing is provided for the long TTI by deciding it based on the start of a data burst transmission, rather than based on the end of the data burst transmission.

An HARQ feedback timing for a long TTI of 4 subframes in a 4:4 TDD DL HARQ will be described as another example.

If the HARQ feedback timing is set according to the start of a data burst transmission, an HARQ feedback for a data burst whose transmission starts in a #0 DL subframe is transmitted in a #0 UL subframe of the next frame. On the other hand, if the HARQ feedback timing is set according to the end of a data burst transmission, an HARQ feedback for a data burst whose transmission ends in a fourth DL subframe is transmitted in a #3 UL subframe of the next frame. Unlike the 5:3 TDD DL HARQ, the 4:4 TDD DL HARQ provides an earlier HARQ feedback timing for the long TTI by deciding it based on the end of a data burst transmission, rather than based on the start of the data burst transmission.

Accordingly, an appropriate HARQ operation timing structure is chosen according to the DL:UL ratio and the Tx/Rx processing time in an exemplary embodiment of the present invention. More specifically, when an HARQ feedback timing is decided in Table 1 to Table 4, the decision may be made based on the index m' ($=m+N_{TTI}-1$) of the last of one or more subframes carrying a data burst instead of the index m of the first of the subframes. Information about the chosen HARQ operation timing structure may be signaled, for example, as system information on a DL common control channel.

Change of HARQ Feedback and Tx Offsets

Other exemplary embodiments of DL and UL HARQ operation timing structures in TDD mode will be described below. More particularly, changing the HARQ feedback offsets and the HARQ Tx offsets according to the position of a subframe carrying a DL or UL data burst will be described.

Figure 11A:
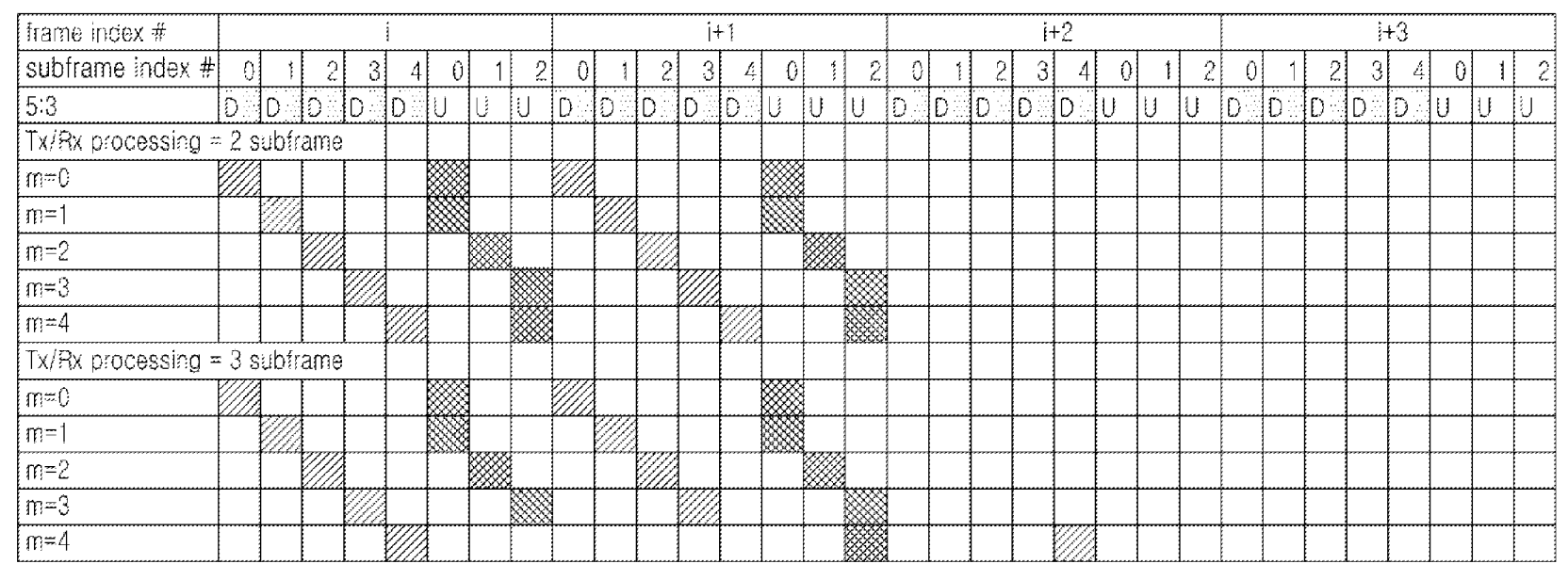
Figure 11B:
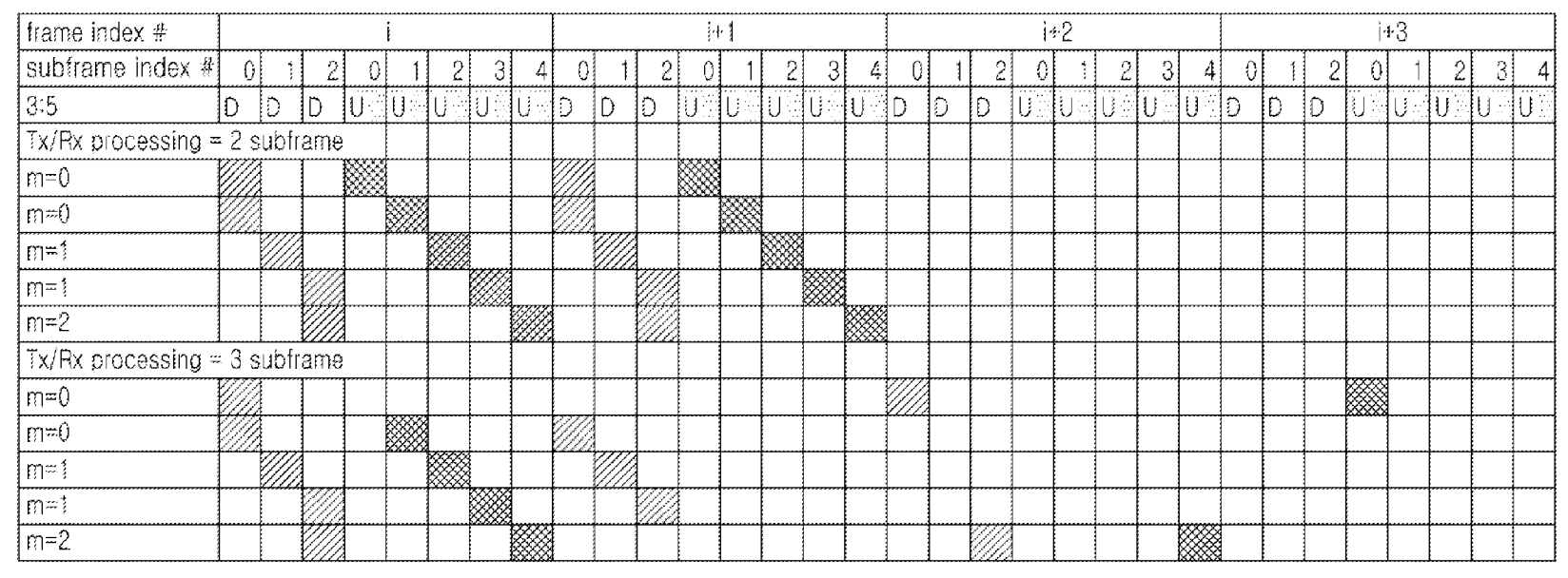

FIGS. 11A and 11B illustrate HARQ operation timing structures when $N_{A-MAP}=1$ and D+U=8.

FIG. 11A illustrates an HARQ operation timing structure in the case where D:U=5:3 and a TTI is one subframe. Referring to FIG. 11A, when the Tx/Rx processing time is 2 subframes, the HARQ feedback/Tx offset is 0. That is, since the transmission of each DL subframe can be completely processed within two subframes (because Gap3 and Gap4 exceed 2), a related UL transmission takes place in the following UL period without a time delay. Similarly, the transmission of each UL subframe can be completely processed within two subframes (because Gap3 and Gap4 exceed 2) and thus a related DL transmission takes place in the following DL period without a time delay.

However, if the Tx/Rx processing time is 3 subframes, an HARQ UL Tx timing related to a #4 DL subframe is delayed by one frame. This is because although 3 subframes are taken to process the transmission of the #4 DL subframe, it is difficult to carry out a UL transmission within 2 subframes (=5−4−1+2) being the interval to a corresponding #2 UL subframe. As a consequence, the UL transmission in the #2 UL subframe corresponding to the #4 DL subframe is delayed by one frame and thus it takes place in a #2 UL subframe of the next #(i+1) frame.

FIG. 11B illustrates an HARQ operation timing structure in the case where D:U=3:5 and a TTI is one subframe. Referring to FIG. 11B, when the Tx/Rx processing time is 2 subframes, the HARQ feedback/Tx offset is 0. However, if the Tx/Rx processing time is 3 subframes, Gap=3−0−1−0=2. Hence, an HARQ UL Tx timing in a #0 UL subframe related to a #0 DL subframe is delayed by one frame. Since Gap=5−4−1+2=2, a DL transmission timing in a #2 DL subframe related to a #4 UL subframe is delayed by one frame. This is because each Gap is smaller than the Tx or Rx processing time.

Figure 12A:
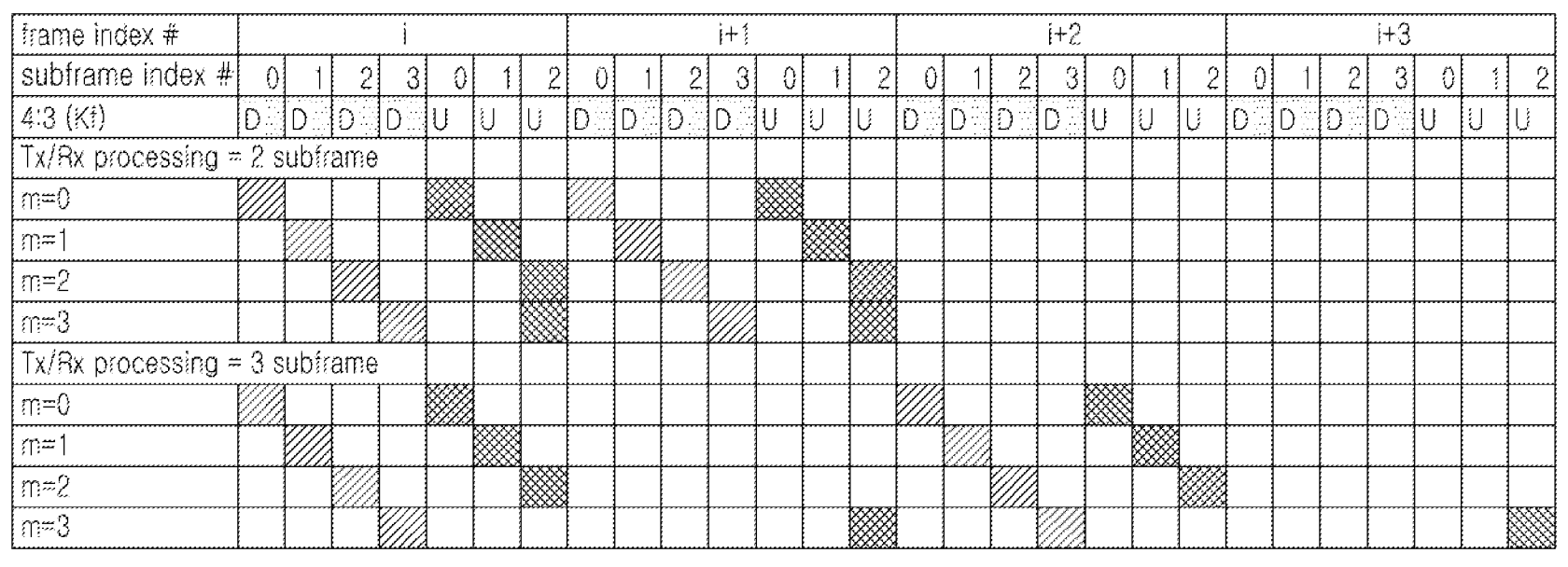
Figure 12B:
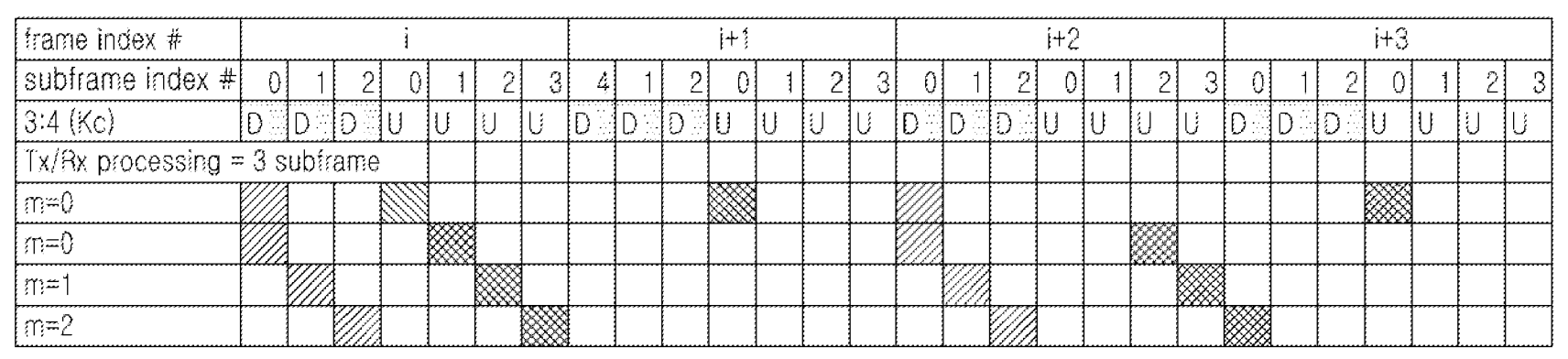

FIGS. 12A and 12B illustrate HARQ operation timing structures when D+U=7.

FIG. 12A illustrates an HARQ operation timing structure in the case where D:U=4:3, $N_{A\text{-}MAP}=1$, and a TTI is one subframe. Referring to FIG. 12A, when the Tx/Rx processing time is 2 subframes, the HARQ feedback/Tx offset is 0. If the Tx/Rx processing time is 3 subframes, an HARQ UL Tx timing of a #2 subframe corresponding to a #3 DL subframe is delayed by one frame because Gap=4−3−1+2=2.

FIG. 12B illustrates an HARQ operation timing structure in the case where D:U=3:4, $N_{A\text{-}MAP}=1$, and a TTI is one subframe. D+U is an odd and D<U, then $K_c(=-1)$ based on a ceil( ) is used. Referring to FIG. 12B, when the Tx/Rx processing time is 2 subframes, the HARQ feedback/Tx offset is 0. If the Tx/Rx processing time is 3 subframes, an HARQ UL Tx timing of a #0 UL subframe corresponding to a #3 DL subframe is delayed by one frame.

Figure 13A:
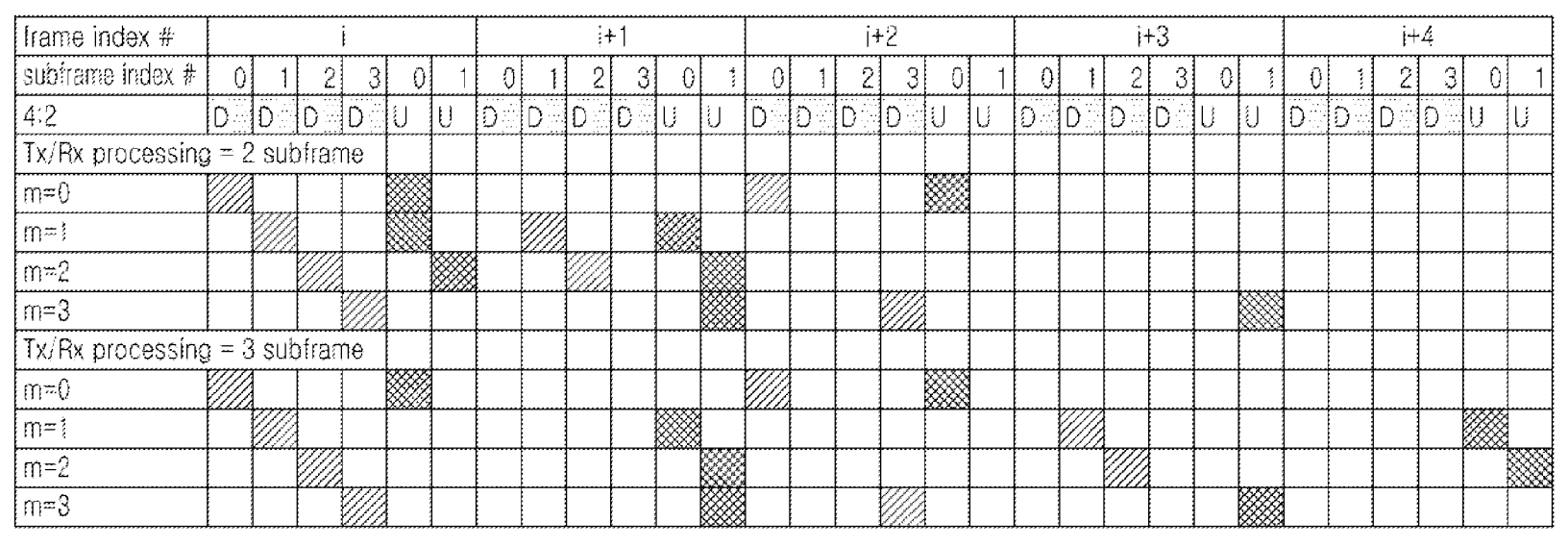
Figure 13B:
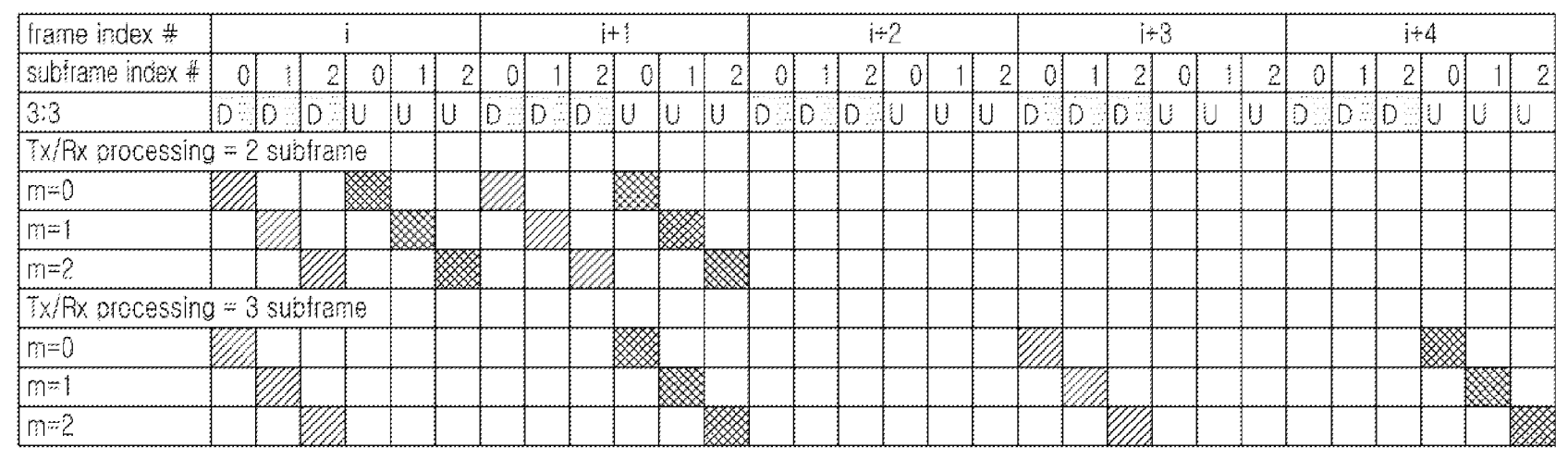

FIGS. 13A and 13B illustrate HARQ operation timing structures when $N_{A\text{-}MAP}=1$ and D+U=6.

FIG. 13A illustrates an HARQ operation timing structure in the case where D:U=4:2 and a TTI is one subframe. Referring to FIG. 13A, when the Tx/Rx processing time is 2 subframes, an HARQ UL Tx timing related to a #3 DL subframe is delayed by one frame. If the Tx/Rx processing time is 3 subframes, an HARQ DL Tx timing related to a #0 UL subframe is delayed by one frame and HARQ UL and DL Tx timings related to #1 and #2 DL subframes are delayed by one frame. In addition, an HARQ UL Tx timing related to a #3 DL subframe is delayed by one frame.

FIG. 13B illustrates an HARQ operation timing structure in the case where D:U=3:3 and a TTI is one subframe. Referring to FIG. 13B, when the Tx/Rx processing time is 2 subframes, the HARQ feedback/Tx offset is 0. However, if the Tx/Rx processing time is 3 subframes, the HARQ feedback/Tx offset is 1, which means a one-frame delay.

Relay Structure

Now a description will be made of HARQ operation timing structures in a wireless mobile communication system supporting a relay structure.

When a relay structure is supported, a BS and an MS communicate with each other, directly or via at least one Relay Station (RS). RSs between the BS and the MS are divided into odd-hop RSs and even-hop RSs. Each RS includes a controller for determining an HARQ Tx time according to a frame structure and an HARQ operation timing which will be described later, and at least one transmitter/receiver for transmitting and receiving data burst assignment information, a data burst, and an HARQ feedback at timings controlled by the controller. And a data transmission represents a data transmission between the BS and the RS or a data transmission between the RS and the MS.

In an exemplary embodiment of the present invention, an HARQ operation timing structure for a 16m-mode operation of an RS and an MS will be described.

Figure 14:
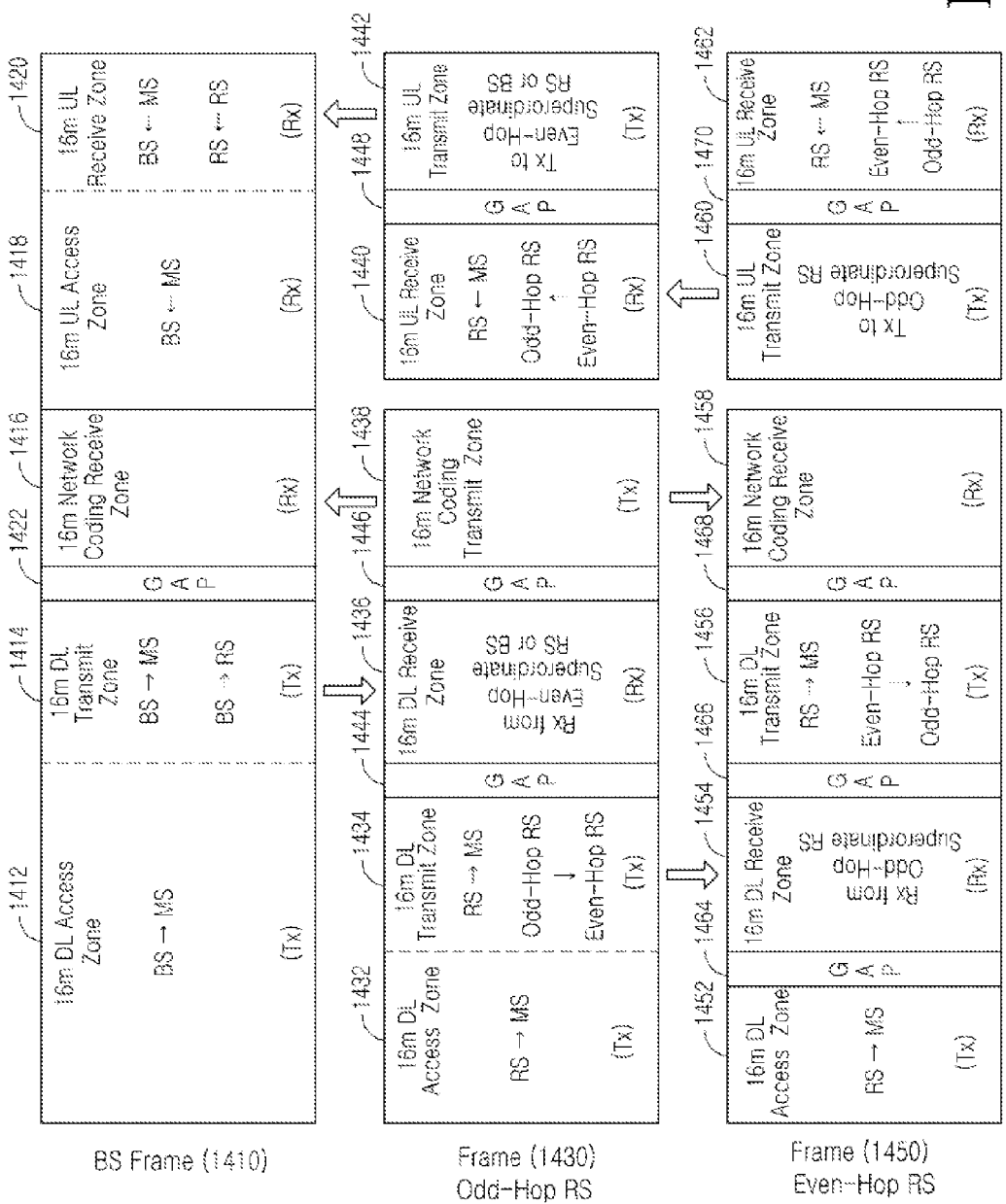
FIG. 14 illustrates a frame structure in a wireless mobile communication system supporting Relay Stations (RSs) according to an exemplary embodiment of the present invention.

FIG. 14 illustrates a frame structure for a wireless mobile communication system supporting a relay structure according to an exemplary embodiment of the present invention.

Referring to FIG. 14, a BS frame 1410 may include at least one of a DL access zone 1412 transmitted from a BS directly to an MS, a DL transmit zone 1414 transmitted from the BS to the MS or an RS, a network coding receive zone 1416, a UL access zone 1418 received from the MS, and a UL receive zone 1420 received from the MS or the RS. A gap 1422 is interposed between the Tx zones 1412 and 1414 and the Rx zones 1416, 1418 and 1420, for transmission to reception transitioning.

An odd-hop RS frame 1430 includes a DL access zone 1432 transmitted to an MS, a DL transmit zone 1434 transmitted to the MS or an even-hop RS, a DL receive zone 1444 received from the even-hop RS or a BS, a network coding transmit zone 1438, a UL receive zone 1440 received from the MS or the even-hop RS, and a UL transmit zone 1442 transmitted to the even-hop RS or the BS. Gaps 1444, 1446, and 1448 are interposed between the Tx zone 1434 and the Rx zone 1436, between the Rx zone 1436 and the Tx zone 1438, and between the Rx zone 1440 and the Tx zone 1442, for transitioning between transmission and reception.

An even-hop RS frame 1450 includes a DL access zone 1452 transmitted to an MS, a DL receive zone 1454 received from an odd-hop RS, a DL transmit zone 1456 transmitted to the MS or the odd-hop RS, a network coding receive zone 1458, a UL transmit zone 1460 transmitted to the odd-hop RS, and a UL receive zone 1462 received from the MS or the odd-hop RS. Gaps 1464, 1466, 1468 and 1470 are interposed between the Tx zone 1452 and the Rx zone 1454, between the Rx zone 1454 and the Tx zone 1456, between the Tx zone 1456 and the Rx zone 1458, and between the Tx zone 1460 and the Rx zone 1462, for transitioning between transmission and reception.

As described above, in an HARQ operation timing structure for zones in which at least one RS communicates with an MS, a DL-UL subframe mapping relationship according subframe indexes are determined according to the DL:UL ratio of the zones in which at least one RS communicates with an MS within an frame of a corresponding RS and frame indexes are determined according to the subframe indexes, as in the afore-described HARQ operation for the legacy supporting mode.

FIGS. 15A and 15B illustrate TDD RS frame structures according to exemplary embodiments of the present invention. In FIGS. 15A and 15B, the TDD frames have a DL:UL ratio of 4:4 (D':U'=4:4) and network coding Tx/Rx zones are not shown.

Referring to FIG. 15A, in a #i frame used for an odd-hop RS, the odd-hop RS transmits #0, #1 and #2 DL subframes to an MS or a lower-layer RS, and receives the other DL subframe from a BS. The odd-hop RS receives #0 and #1 UL subframes from the MS and transmits the other two UL subframes to a higher-layer RS or the BS.

Referring to FIG. 15B, in a #i frame used for an even-hop RS, the even-hop RS transmits a #0 DL subframe at the start and #1 DL subbframe at the end of the DL period to an MS and receives the two middle DL subframes from a higher-layer odd-hop RS. The even-hop RS receives #0 and #1 UL subframes at the last of the UL period from the MS and transmits the other two UL subframes at the start of the UL period to the higher-layer off-hop RS.

Figure 16A:
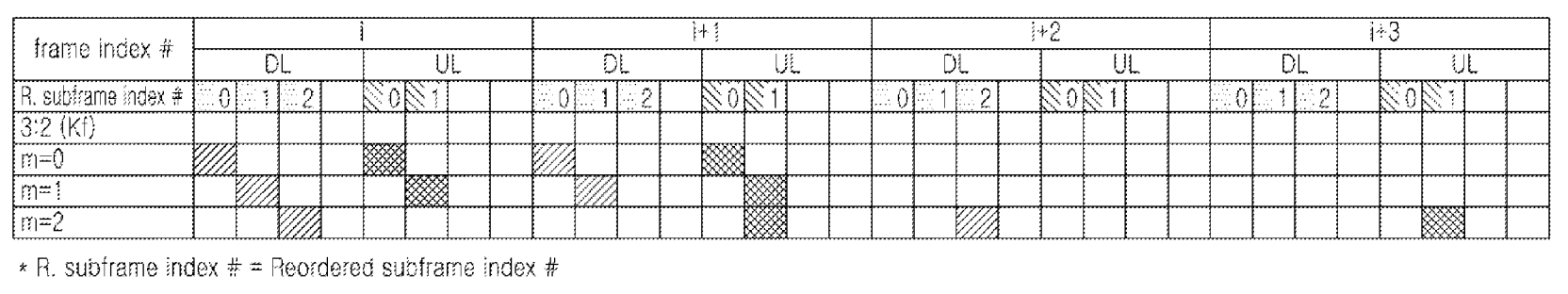
Figure 16B:
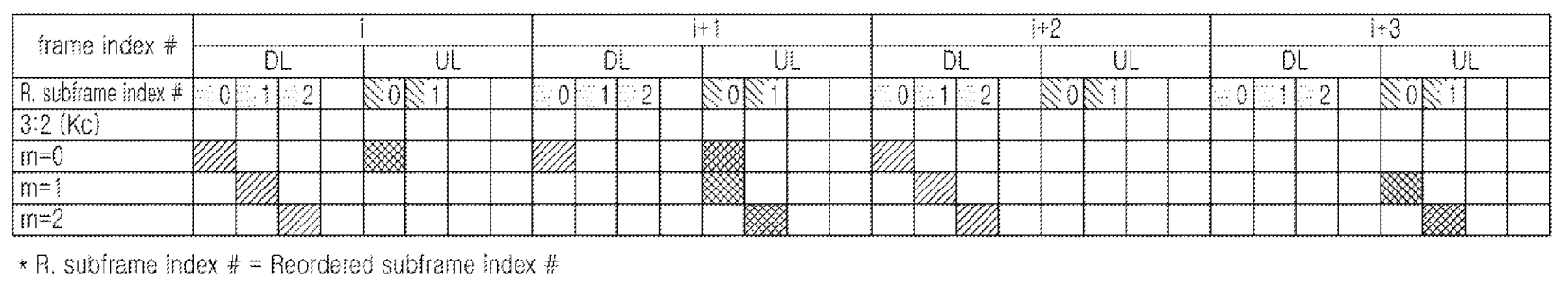

FIGS. 16A and 16B illustrate HARQ operation timing structures for an odd-hop RS according to exemplary embodiments of the present invention. D:U=3:2 in FIGS. 16A and 16B.

FIG. 16A illustrates an HARQ operation timing structure considering $K_f$. Referring to FIG. 16A, an HARQ UL Tx timing corresponding to a #2 DL subframe is delayed by one frame.

FIG. 16B illustrates an HARQ operation timing structure considering Kc. Referring to FIG. 16B, each of HARQ UL Tx timings corresponding to #1 and #2 DL subframes is delayed by one frame.

Figure 17:
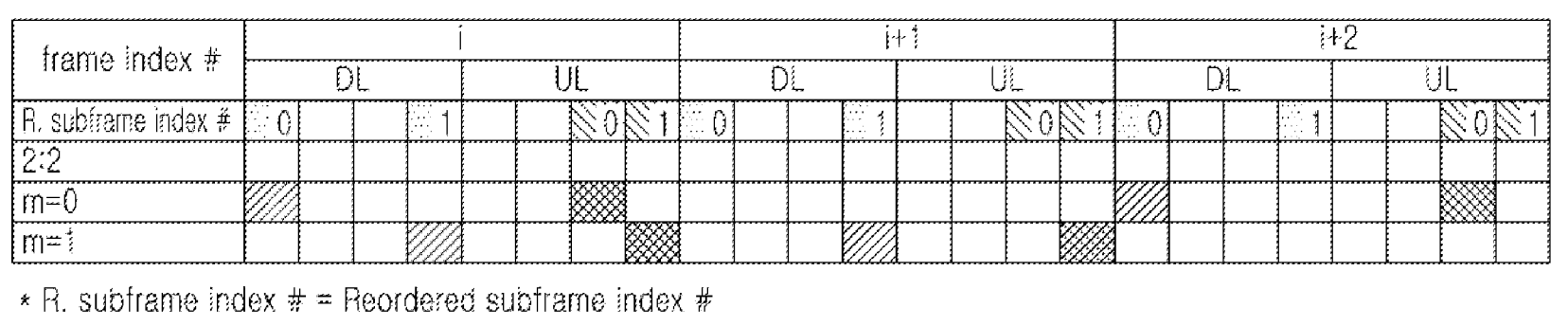

FIG. 17 illustrates an HARQ operation timing structure for an even-hop RS according to an exemplary embodiment of the present invention. D:U=2:2 in FIG. 17. As noted from FIG. 17, an HARQ DL Tx timing corresponding to a #0 UL subframe is delayed by one frame.

As described above, a K value may need to be chosen according to a DL:UL ratio and a Tx/Rx processing time in order to provide an earlier HARQ timing A system operator may choose an appropriate HARQ operation timing structure and an appropriate K value according to system configuration information such as a DL:UL ratio and a Tx/Rx processing time and the system configuration information is transmitted on a DL common control channel.

HARQ Timing Structures for Long TTI

Hereinbelow, HARQ timing structures based on assignment information for a long TTI will be described with reference to Table 3 and Table 4.

In DL HARQ, if data burst assignment information indicating transmission of a data burst with a long TTI is transmitted in a specific DL subframe, the long TTI transmission is transmitted in a #0 DL subframe of the next frame. An HARQ feedback for the long TTI transmission is transmitted in a UL subframe mapped to the DL subframe (that is, carrying the data burst assignment information) of a following frame. In UL HARQ, if a long TTI transmission indicated by data burst assignment information transmitted in a specific DL subframe is not available in the same frame, the UL data burst of the long TTI transmission is transmitted in a #0 UL subframe of the next frame and an HARQ feedback for the UL data burst is transmitted in a DL subframes having the same index in the DL subframe (that is, carrying the data burst assignment information) of a following frame. And frame indexes are determined by using the above HARQ Tx offset and a HARQ feedback offset. For example, when data burst assignment information transmitted in a #1 subframe (l is not zero) indicates transmission of a DL data burst with a long TTI that spans the entire DL period ($N_{TTI}$=D), a burst transmission starts at a #0 DL subframe. However, if data burst assignment information on a DL subframe 1, 1 being not equal to 0, indicates the long TTI transmission, the DL data burst is not transmitted in the same frame and the data burst assignment information is considered to indicate the long TTI transmission in the next frame.

Referring to Table 3 for DL HARQ, data burst assignment information transmitted in a #l DL subbframe of a #i frame indicates a data burst transmission in a #m DL subframe according to $N_{A-MAP}$. However, in case of a long TTI transmission, the start of the data burst transmission is determined according to the DL subframe index m and the TTI of the data burst, $N_{TTI}$. Hence, the long TTI transmission starts in a #h DL subframe of a #a frame and an HARQ feedback for the long TTI transmission is transmitted in a #f UL subframe of a #b frame. If the UL HARQ feedback is a NACK signal, a retransmission of the data burst takes place in the #h or following DL subframe of a #c frame. The frame indexes a, b and c and the subframe indexes h and f are determined according to the indexes i, l and m acquired from the data burst assignment information, the UL subframe index n corresponding to the indexes i, l and m, and $N_{TTI}$, as follows.

If D−m≧$N_{TTI}$, the long TTI transmission indicated by the data burst assignment information starts in the #m subframe of the #i frame and thus a=i and h=m. On the other hand, if D−m<$N_{TTI}$, the remaining DL frame period is smaller than $N_{TTI}$ and thus the data burst cannot be transmitted in the #i frame. Hence, the long TTI transmission starts in a #0 subframe of the #(i+1) frame and a=i+1 and h=0.

To avoid concentration of UL HARQ feedbacks in a specific UL subframe, the index f of a UL subframe carrying a UL HARQ feedback for the data burst is determined according to the index l of the DL subframe carrying the data burst assignment information. The relationship between l and f follows the relationship between m and n defined in Table 3. Accordingly, the UL HARQ feedback is transmitted in the next frame and thus b=a+1(=i+2).

For example, if $N_{TTI}$=5, $N_{A-MAP}$=1, K=1, and the Tx/Rx processing time=3 in a 5:3 TDD structure, a long TTI transmission indicated by data burst assignment information transmitted in a #2 DL subframe (l=2) of a #i frame starts in a #0 (h=0) DL subframe of a #(i+1) (a=(i+1)) frame because D−m (5−2)<$N_{TTI}$(=5) and a UL HARQ feedback for the data burst is transmitted in a #1 (n=2−1) UL subframe of a #(i+2) (b=(i+2)) frame.

In another example, if a long TTI spans the whole DL period in TDD DL, a data burst transmission always starts in a #0 DL subframe. In this system, when data burst assignment information in a #l DL subbframe indicates a long-TTI DL transmission, if l=0, the subframe indexes m and n and the frame index j for the HARQ operation are calculated by Table 3. On the contrary, if l≠0, the data burst assignment information indicates a data burst transmission that starts in a #0 subframe of a #(i+1) frame next to the #i frame. An HARQ feedback for the data burst is transmitted in a #n subframe of a #j frame. Herein, n and j are computed by equation (14), not by Table 3. That is, the position at which an HARQ feedback is transmitted, (n, j) is determined based on the subframe index l of data burst assignment information and the frame index (j+1) of a data burst.

$$n = \begin{cases} 0, & \text{for } 0 \le l < K \\ l - K, & \text{for } K \le l < U + K, \text{For } D > U \\ U - 1, & \text{for } U + K \le l < D \end{cases} \quad (14)$$

$$n = l - K, \text{For } D \le U$$

$$j = ((i + 1) + z) \bmod N$$

where m=0 and $N_{TTI}$=D. Therefore, z is calculated by equation (15) by substituting 0 and D into m and $N_{TTI}$, respectively in equation (12). Herein, n is determined based on the index l of the DL subframe carrying the data burst assignment information.

$$z = \begin{cases} 0, & \text{for } n \ge \text{Rx\_Time} \\ 1, & \text{for } n < \text{Rx\_Time} \end{cases} \quad (15)$$

Referring to Table 4 for UL HARQ, data burst assignment information transmitted in a #l DL subbframe of a #i frame indicates a data burst transmission that starts in a #m UL subframe of a #j frame according to $N_{A-MAP}$ and the DL subframe index l. In the case of a long TTI transmission, the start of the data burst transmission is determined according to the UL subframe index m and the TTI of the data burst, $N_{TTI}$. Hence, the long TTI transmission starts in a #h DL subframe of a #a frame and an HARQ feedback for the long TTI transmission is transmitted in a #f DL subframe of a #b frame. If the DL HARQ feedback is a NACK signal, a retransmission of the data burst takes place in the #h UL subframe of a #c frame. The frame indexes a, b and c and the subframe indexes h and f are determined according to the indexes i and l carrying the data burst assignment information, the UL frame and subframe indexes j and m corresponding to the indexes i and l, and $N_{TTI}$, as follows.

If $U-m \geq N_{TTI}$, it becomes j=i, the long TTI transmission indicated by the data burst assignment information starts in the #m subframe of the #j frame and thus a=i and h=m. On the other hand, if $U-m<N_{TTI}$, it becomes j=i+1, the remaining UL frame period is smaller than $N_{TTI}$ and thus the data burst cannot be transmitted in the #i frame. Hence, the long TTI transmission starts in a #0 UL subframe of the #(i+1) frame and thus a=i+1 and h=0. Since a DL HARQ feedback is transmitted in the #l DL subframe, f=l. Referring to equation (13), if $U-h-N_{TTI}+1 \geq Rx\_Time4$, a DL HARQ feedback is transmitted in a #b (b=(a+1)) frame. If $U-h-N_{TTI}+1<Rx\_Time4$, the DL HARQ feedback is transmitted in a #b (b=(a+2)) frame. If the DL HARQ feedback is a NACK signal, a retransmission starts in a #h UL subframe of a #c frame. Similarly to the calculation of the frame index a, if a=i, c=b. If a=i+1, c=b+1.

For example, if $N_{TTI}=3$, $N_{A-MAP}=1$, and the Tx/Rx processing time=3 in a 5:3 TDD structure, a UL data burst transmission indicated by data burst assignment information in a #2 DL subframe of a #i frame starts in a #0 (h=0) UL subframe of a #(i+1) (a=(i+1)) frame because U-m (3-1)$N_{TTI}$(=3) and a DL HARQ feedback for the data burst is transmitted in a #2 (f=2) UL subframe of a #(i+2) (b=(i+2)) frame. If the DL HARQ feedback is a NACK signal, a retransmission takes place in a #0 UL subframe of a #(i+3), i.e. (b+1=i+3) frame, similarly to the calculation of a=i+1 based on a HARQ Tx offset being 1.

In another example, if a long TTI spans the whole UL period in TDD UL, a data burst transmission always starts in a #0 UL subframe. In this system, when data burst assignment information in a #l DL subbframe indicates a long-TTI UL transmission, a data burst corresponding to the subframe index l starts to be transmitted in a #0 subframe of a #j frame (m=0). An HARQ feedback for the data burst is transmitted in a #l DL subbframe of a #k frame. If the HARQ feedback is a NACK signal, an HARQ retransmission starts in a #0 UL subframe of a #p frame. The frame indexes j, k and p are computed by equations defined in Table 4 using the HARQ Tx offset v and the HARQ feedback offset w that are determined taking into account m=0.

In FDD, DL subframes and UL subframes are successive respectively in their different frequency bands. Thus a long TTI transmission may start in any subframe. However, if the start of a long TTI transmission is limited to a specific subframe in view of implementation complexity or any other factor, control information (e.g., resource allocation information and HARQ feedback information) may concentrate in a specific subframe, as in TDD. Accordingly, an HARQ timing needs to be readjusted in FDD, similarly to TDD.

If the start of a long TTI transmission is limited to a specific DL subframe, DL subframe x for a DL HARQ operation in an FDD system, the following HARQ timing may be considered. The long TTI transmission includes at least one DL subframe $(x_1, x_2, \ldots, x_{max})$. Herein, $N_{A-MAP}$ is 1. That is, when data burst assignment information transmitted in a #l DL subbframe (l≠x) indicates a long TTI transmission, the long TTI transmission starts in a DL subframe that allows for the long TTI transmission after the #l subframe.

In the above case, if data burst assignment information transmitted in a #l DL subframe indicates a long-TTI DL transmission and l=x, the subframe indexes m and n and the frame index j for an HARQ operation are computed by Table 1. On the contrary, if l≠x, the data burst transmission starts in the #m frame. An HARQ feedback for the data burst is transmitted in the #n subframe of the #j frame. Here, the indexes m, n and j are determined by equation (16), not by Table 1. That is, the position of the HARQ feedback, (n, j) is determined based on the DL subframe index l of the data burst assignment information, the subframe index x and frame index of the data burst.

$$m = \begin{cases} x_1^i & 0 \leq l \leq x_1 \\ x_2^i & x_1 < l \leq x_2 \\ \vdots & \vdots \\ x_{max}^i & x_{max-1} \leq l \leq x_{max} \\ x_1^{i+1} & x_{max} < l < F \end{cases} \quad (16)$$

$$n = \text{ceil}(l + F/2) \bmod F$$

$$j = \left( i + \text{floor}\left(\frac{\text{ceil}(m + F/2)}{F}\right) + z \right) \bmod N$$

$$z = \begin{cases} 0 & \text{if}(\text{ceil}(F/2) - N_{TTI} + (m - l)) \geq \text{Processing time} \\ 1 & \text{else} \end{cases}$$

where $x_n^i$ denotes a #$x_n$ subframe of a #i frame and l=0, 1, . . . , F−1.

For example, if the start of a TTI transmission is confined to #0 and #4 DL subframes, F=8, $N_{TTI}=4$, and the Tx/Rx processing time is 3 subframes, a long TTI transmission indicated by data burst assignment information in a #1, #2 or #3 DL subframe (i.e., $x_2=4$) of a #i frame starts in a #4 DL subframe of the #i frame (m=4) and an HARQ feedback for the long TTI transmission is transmitted in a #n UL subframe of a #(i+1) frame. Herein, n ranges from 5 to 7. Herein, (ceil(8/2)−4+3) is equal to or larger than 3 and thus z=0. Also, a long TTI transmission indicated by data burst assignment information in #5 to #7 DL subframes of the #i frame starts in a #0 DL subframe of the #(i+1) frame (m=0) and an HARQ feedback for the long TTI transmission is transmitted in a #n UL subframe of a #(i+2) frame. Herein, n ranges from 1 to 3. Herein, (ceil(8/2)−4−5) is smaller than 3 and thus z=1.

In FDD UL HARQ, if the start of a long TTI transmission is limited to a specific UL subframe, UL subframe y for a UL HARQ operation in the FDD system, the following HARQ timing may be considered. The long TTI transmission includes at least one UL subframe $(y_1, y_2, \ldots, y_{max})$.

In the above case, if data burst assignment information transmitted in a #l DL subbframe indicates a long-TTI UL transmission and n=y, the subframe index m and the frame index j for the HARQ operation are computed by Table 2. On the contrary, if n≠y, the data burst transmission starts in the #m UL subframe. That is, the data burst assignment information indicates a data burst transmission in the #m UL subframe of the #j frame. An HARQ feedback for the data burst is transmitted in a #l DL subframe of a #k frame. If the HARQ feedback is a NACK signal or resource assignment for a retransmission is indicated, the HARQ retransmission starts in the #m subframe of a #p frame. Here, the indexes m, j, k and p are determined by equation (17), not by Table 2. That is, the position of the HARQ feedback, (m, j) is determined based on the DL subframe index l of the data burst assignment information, the subframe index y and frame index i of the data burst.

The frame indexes j, k and p are calculated by equations defined in Table 2 using the HARQ Tx and feedback offsets v and w that are determined taking into account m=0.

$$m = \begin{cases} y_1^i & 0 \leq n \leq y_1 \\ y_2^i & y_1 < n \leq y_2 \\ \vdots & \vdots \\ y_{max}^i & y_{max-1} < n < y_{max} \\ y_1^{i+1} & y_{max} < n < F \end{cases} \quad (17)$$

$$n = \text{ceil}(l + F/2) \bmod F$$

$$j = \left(i + \text{floor}\left(\frac{\text{ceil}(l + F/2)}{F}\right) + v\right) \bmod N$$

$$v = \begin{cases} 0 & \text{if}(\text{ceil}(F/2) - 1 + (m - n)) \geq \\ & \text{Process in } g \text{ time} \\ 1 & \text{else} \end{cases}$$

$$k = \left(j + \text{floor}\left(\frac{\text{ceil}(n + F/2)}{F}\right) + w\right) \bmod N$$

$$p = \left(k + \text{floor}\left(\frac{\text{ceil}(l + F/2)}{F}\right) + v\right) \bmod N$$

$$w = \begin{cases} 0 & \text{if}(\text{floor}(F/2) - N_{TTI} + (n - m)) \geq \\ & \text{Process}ing \text{ time} \\ 1 & \text{else} \end{cases}$$

where $y_n^i$ denotes a #$y_n$ subframes of a #i frame, and l=0, 1, . . . , F−1.

For example, if the start of a TTI transmission is confined to #0 and #4 UL subframes (i.e., $y_1$=0, $y_1$=4), F=8, $N_{TTI}$=4, and the Tx/Rx processing time is 3 subframes, a long TTI transmission indicated by data burst assignment information in a #1, #2 or #3 DL subframe (i.e., since 1≤l≤3, 5≤n≤7) of a #i frame starts in a #0 UL subframe of the #(i+1) frame and an HARQ feedback for the long TTI transmission is transmitted in a #1, #2 or #3 DL subframe of a #(i+2) frame. Herein, (ceil(8/2)−1+0−n) is smaller than 3 and thus v=1. Since (floor(8/2)−4+n−0) is equal to or larger than 3, w=0. Also, a long TTI transmission indicated by data burst assignment information in a #5, #6 or #7 DL subframe (i.e., since 5≤l≤7, 1≤n≤3) of a #i frame starts in a #4 UL subframe of the #(i+1) frame (m=4) and an HARQ feedback for the long TTI transmission is transmitted in a #l (l is one of 5, 6 and 7) subframe of a #(i+2) frame. If the HARQ feedback is a NACK signal and resource assignment for a retransmission is indicated, the HARQ retransmission starts in a #4 UL subframe of a #(i+3) frame. Since (ceil(8/2)−1+4−n) is equal to or larger than 3, v=0. Since (floor(8/2)−4+n−4) is smaller than 3, w=1.

In another exemplary embodiment of the present invention, if data burst assignment information is transmitted in every DL subframe, $N_{A-MAP}$=1. Hence, Table 1 to Table 4 are modified into Table 5 to Table 8, respectively. The following tables may be used to determine the transmission time of at least one of an assignment A-MAP with data burst assignment information, an HARQ subpacket carrying a data burst, an HARQ feedback (ACK or NACK), and an HARQ retransmission subpacket. However, it is to be understood that the tables should not be construed as limiting the present invention.

TABLE 5

| Content | Subframe index | Frame index |
|---|---|---|
| Assignment A-MAP IE Tx in DL | l | i |
| HARQ Subpacket Tx in DL | m = l | i |
| HARQ feedback in UL | n = ceil (m + F/2) mod F | $j = \left(i + \text{floor}\left(\frac{\text{ceil}(m + F/2)}{F}\right) + z\right) \bmod N$ |
| HARQ subpacket ReTx in DL (in case of SHARQ) | m | $k = \left(j + \text{floor}\left(\frac{n + F/2}{F}\right) + u\right) \bmod N$ |

TABLE 6

| Content | Subframe index | Frame index |
|---|---|---|
| Assignment A-MAP IE Tx in DL | l | i |
| HARQ Subpacket Tx in UL | m = n where n = ceil(l + F/2) mod F | $j = \left(i + \text{floor}\left(\frac{\text{ceil}(l + F/2)}{F}\right) + v\right) \bmod N$ |
| HARQ feedback in DL | l | $k = \left(j + \text{floor}\left(\frac{m + F/2}{F}\right) + w\right) \bmod N$ |
| HARQ subpacket ReTx in UL | m | $p = \left(k + \text{floor}\left(\frac{\text{ceil}(l + F/2)}{F}\right) + v\right) \bmod N$ |

TABLE 7

| Content | Subframe index | Frame index |
|---|---|---|
| Assignment A-MAP IE Tx in DL | l | i |
| HARQ Subpacket Tx in DL | m = l | i |
| HARQ feedback in UL | For D > U, $n = \begin{cases} 0, & \text{for } 0 \leq m < K \\ m - K, & \text{for } K \leq m < U + K \\ U - 1, & \text{for } U + K \leq m < D \end{cases}$ For D ≤ U, n = m − K | j = (i + z) mod N |
| HARQ subpacket ReTx in DL | l | k = (j + 1 + u) mod N |

TABLE 8

| Content | Subframe index | Frame index |
|---|---|---|
| Assignment A-MAP IE Tx in DL | l | i |

TABLE 8-continued

| Content | Subframe index | Frame index |
|---|---|---|
| HARQ Subpacket Tx in UL | For $D \geq U$, $m = \begin{cases} 0, & \text{for } 0 \leq l < K \\ l - K, & \text{for } K \leq l < U + K \\ U - 1, & \text{for } U + K \leq l < D \end{cases}$<br>For $1 < D < U$,<br>$m = \begin{cases} 0, \ldots, \text{ or } l - K, \text{ for } l = 0 \\ l - K, \text{ for } 0 < l < D - 1 \\ l - K, \ldots, \text{ or } U - 1, \text{ for } l = D - 1 \end{cases}$<br>For $D = 1$<br>$m = 0, 1, \ldots,$ or $U - 1$, for $l = 0$ | $j = (i + v)$ mod N |
| HARQ feedback in DL | l | $k = (j + 1 + w)$ mod N |
| HARQ Subpacket ReTx in UL | m | $p = (k + v)$ mod N |

For instance, when each superframe includes four frames as illustrated in FIG. 1, N is 4 in Table 5 to Table 8. If D is equal to U in 'HARQ feedback in UL' of Table 7 or 'HARQ Subpacket Tx in UL' of Table 8, n has equality regardless to the above equations. That is, n=m−k.

According to a modified embodiment, a transmitter and a receiver are possessed of at least one table having result values corresponding to all possible input values according the equations of Tables 4 to 8 or Table 9 to 12 and may read result values corresponding to current input values to determine HARQ timing. In one example, the input values represent a subframe index and a frame index of an assignment A-MAP IE Tx in DL.

According to a modified embodiment of the present invention, following Table 9 to Table 12 may be used to determine HARQ timing by using the transmission time of an assignment A-MAP with data burst assignment information.

TABLE 9

FDD DL HARQ timing

| Content | Subframe Index | Frame index |
|---|---|---|
| Assignment A-MAP IE Tx in DL | l | i |
| HARQ Subpacket Tx in DL | m = l | i |
| HARQ feedback in UL | n = ceil(m + F/2) mod F | $j = \left(i + \text{floor}\left(\frac{\text{ceil}(m + F/2)}{F}\right) + z\right) \bmod 4$<br>Where<br>$z = \begin{cases} 0, & \text{if } ((\text{ceil}(F/2) - 1) \geq \text{Tx\_Time}) \\ 1, & \text{else} \end{cases}$ |

TABLE 10

FDD UL HARQ timing

| Content | Subframe Index | Frame Index |
|---|---|---|
| Assignment A-MAP IE Tx in DL | l | i |
| HARQ Subpacket Tx in UL | m = ceil (l + F/2) mod F | $j = \left(i + \text{floor}\left(\frac{\text{ceil}(l + F/2)}{F}\right) + v\right) \bmod 4$<br>Where<br>$v = \begin{cases} 0, & \text{if } ((\text{ceil}(F/2) - 1) \geq \text{Tx\_Time}) \\ 1, & \text{else} \end{cases}$ |
| HARQ feedback in DL | l | $k = \left(j + \text{floor}\left(\frac{m + F/2}{F}\right) + w\right) \bmod 4$<br>Where<br>$w = \begin{cases} 0, & \text{if } ((\text{floor}(F/2) - N_{TTI}) \geq \text{Rx\_Time}) \\ 1, & \text{else} \end{cases}$ |
| HARQ Subpacket ReTx in UL | m | $p = \left(k + \text{floor}\left(\frac{\text{ceil}(l + F/2)}{F}\right) + v\right) \bmod 4$<br>Where<br>$v = \begin{cases} 0, & \text{if } ((\text{ceil}(F/2) - 1) \geq \text{Tx\_Time}) \\ 1, & \text{else} \end{cases}$ |

TABLE 11

TDD DL HARQ timing

| Content | Subframe Index | Frame Index |
|---|---|---|
| Assignment A-MAP IE Tx in DL | l | i |
| HARQ Subpacket Tx in DL | m = l | i |

TABLE 11-continued

TDD DL HARQ timing

| Content | Subframe Index | Frame Index |
|---|---|---|
| HARQ feedback in UL | For $D \geq U$<br>$n = \begin{cases} 0, & \text{for } 0 \leq m < K \\ m - K, & \text{for } K \leq m < U + K \\ U - 1, & \text{for } U + K \leq m < D \end{cases}$<br>where<br>$K = \text{floor}((D - U)/2)$<br>For $D < U$<br>$n = m - K$<br>where<br>$K = -\text{ceil}((U - D)/2)$ | $j = (i + z) \bmod 4$<br>where<br>$z = \begin{cases} 0, & \text{if } (D - m - N_{TTI} + n) \geq \text{Rx\_Time} \\ 1, & \text{else} \end{cases}$ |

TABLE 12

TDD UL HARQ timing

| Content | Subframe Index | Frame Index |
|---|---|---|
| Assignment A-MAP IE Tx in DL | l | i |
| HARQ Subpacket Tx in UL | For default TTI and $D \geq U$<br>$m = \begin{cases} 0, & \text{for } 0 \leq l < K \\ l - K, & \text{for } K \leq l < U + K \\ U - 1, & \text{for } U + K \leq l < D \end{cases}$<br>Where<br>$K = \text{floor}((D - U)/2)$<br>For default TTI and $D < U$<br>$m = \begin{cases} 0, \ldots, \text{ or } l - K, & \text{for } l = 0 \\ l - K, & \text{for } 0 < l < D - 1 \\ l - K, \ldots, \text{ or } U - 1, & \text{for } l = D - 1 \end{cases}$<br>Where<br>$K = -\text{ceil}((U - D)/2)$<br>For long TTI<br>$m = 0$ | $j = (i + v) \bmod 4$<br>Where<br>$v = \begin{cases} 0, & \text{if } (D - l - 1 + m \geq \text{Tx\_Time}) \\ 1, & \text{else} \end{cases}$ |
| HARQ feedback in DL | l | $k = (j + 1 + w) \bmod 4$<br>Where<br>$w = \begin{cases} 0, & \text{if } (U - m - N_{TTI} + l \geq \text{Rx\_Time}) \\ 1, & \text{else} \end{cases}$ |
| HARQ Subpacket ReTx in UL | m | $p = (k + v) \bmod 4$<br>Where<br>$v = \begin{cases} 0, & \text{if } (D - l - 1 + m \geq \text{Tx\_Time}) \\ 1, & \text{else} \end{cases}$ |

It may be contemplated as a further exemplary embodiment of the present invention that the above-described UL HARQ operation timings are applied to channels for which resource assignment is placed in a certain relationship with a UL transmission. For instance, in case of a UL fast feedback channel, a BS transmits resource assignment information for a fast UL feedback in a #l subframe of a #i frame. The transmission timing of the fast UL feedback information, that is, frame and subframe indexes are determined based on i and l. More specifically, the frame index j and subframe index m of the UL fast feedback information are determined by one of Table 2, Table 4, Table 6 and Table 8.

While it has been described herein regarding a TDD system that DL subframes and UL subframes are indexed separately within the DL and UL, the DL and UL subframes may be sequentially indexed within a frame including the DL and the UL. Then a UL subframe index x is replaced with a subframe index d+x in a frame.

Figure 18:
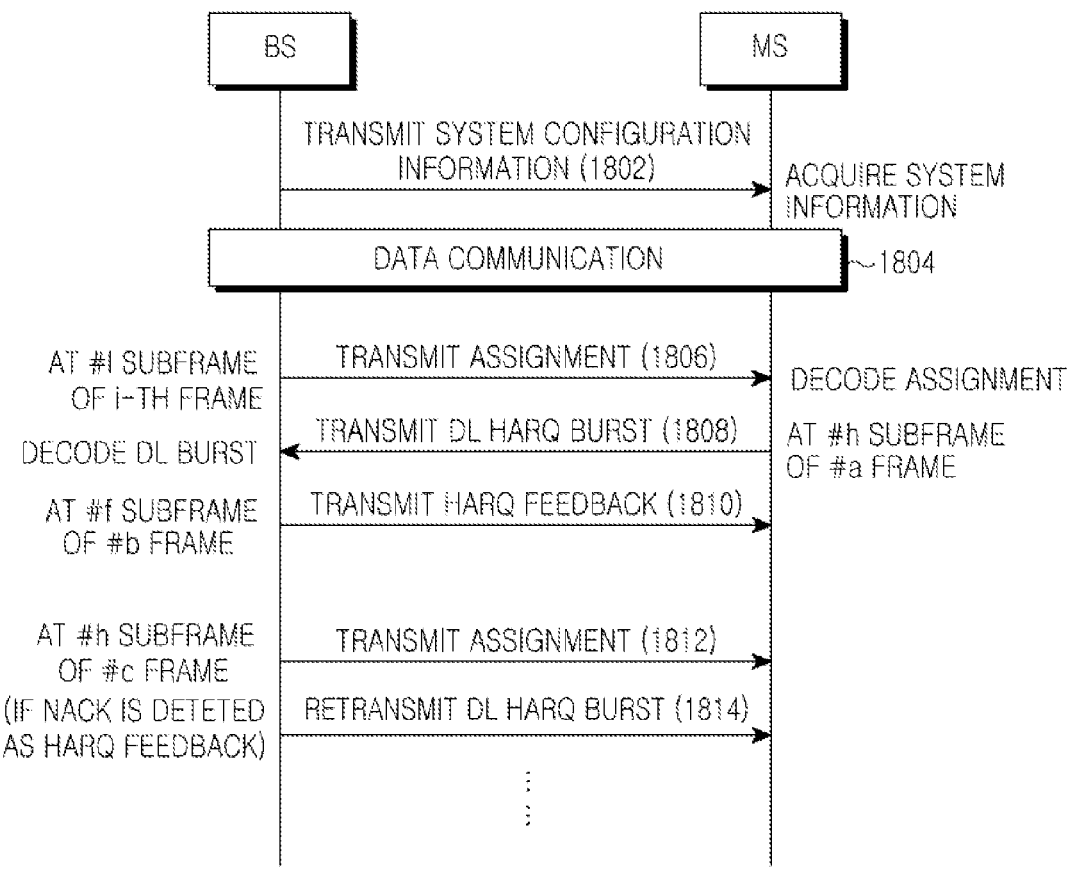
FIGS. 18 and 19 are diagrams illustrating signal flows for operations between a Base Station (BS) and a Mobile Station (MS) according to DL and UL HARQ timing structures according to exemplary embodiments of the present invention.
Figure 19:
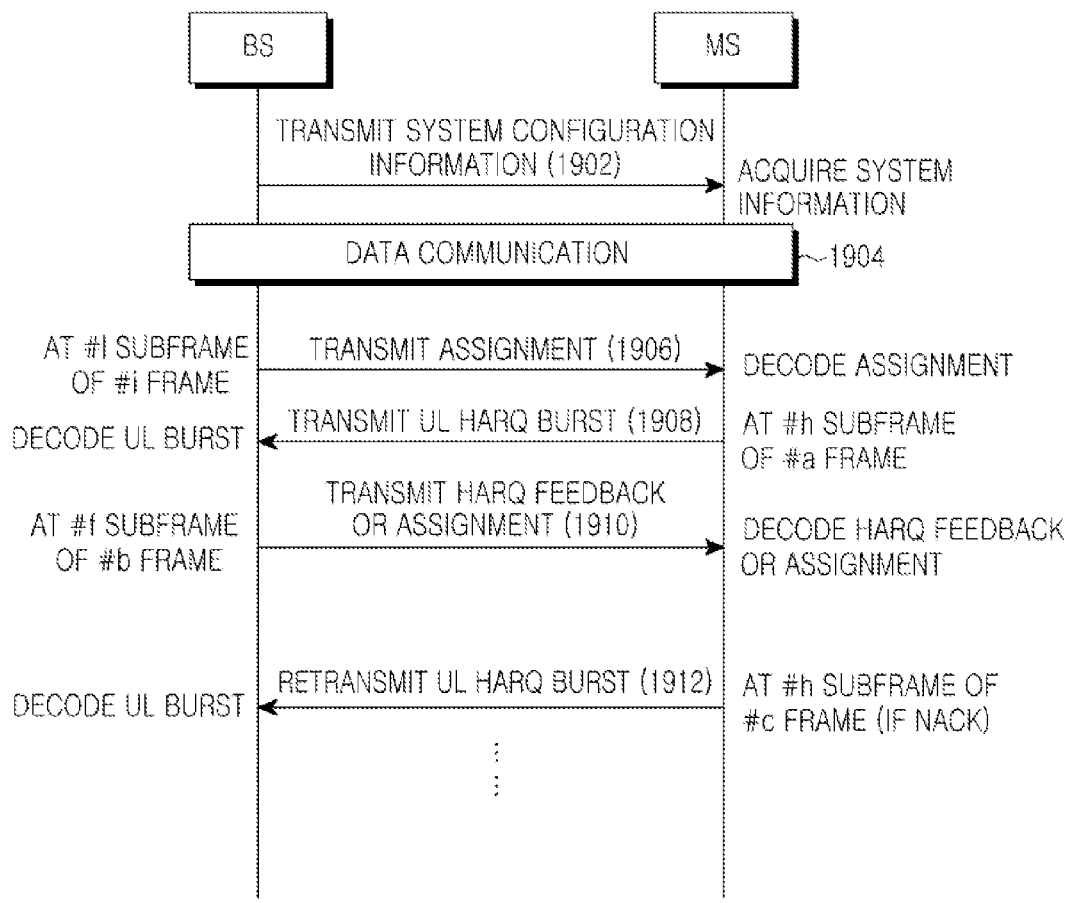

FIGS. 18 and 19 are diagrams illustrating signal flows for operations between a BS and an MS according to DL and UL HARQ timing structures according to exemplary embodiments of the present invention.

Referring to FIG. 18, the BS transmits system configuration information to the MS in step 1802. The system configuration information is broadcast by the BS or acquired by negotiation between the BS and the MS, to allow the MS to access the system. The system configuration information is required for implementing the HARQ timing structures, including a bandwidth (the total number of subframes), the number of subframes of each link (DL and UL), the Tx/Rx processing time of the BS, and the Tx/Rx processing time of the MS.

After the MS acquires system information from the system configuration information and accesses the BS, the BS and the MS are able to perform data communication with each other in step 1804. In a modified embodiment, step 1804 may be omitted when the MS already knows the system configuration information.

In step 1806, the BS transmits assignment information including or indicating a frame index, a subframe index, a long TTI, and MAP relevance information to the MS in a #l DL subbframe of a #i frame. The MS extracts necessary information by decoding the assignment information. The MS determines the frame and subframe indexes of each HARQ operation based on the frame and subframe indexes of the previous HARQ operation according to at least one of the afore-described exemplary embodiments of the present invention.

In step 1808, the BS transmits a DL HARQ burst in a #h subframe of a #a frame according to the assignment information and the MS decodes the DL HARQ burst based on the assignment information. The MS transmits an HARQ feedback for the DL HARQ burst according to the decoding result to the BS in a #f subframe of a #b frame in step 1810.

In step 1812, the next assignment information may be transmitted in the #h subframe of a #c frame according to a predefined assignment information transmission period. If the HARQ feedback is a NACK signal, the DL HARQ burst may be retransmitted in step 1814.

Referring to FIG. 19, the BS transmits system configuration information to the MS in step 1902. After the MS acquires system information from the system configuration information and accesses the BS, the BS and the MS are able to perform data communication with each other in step 1904.

In step 1906, the BS transmits assignment information including or indicating a frame index, a subframe index, a long TTI, and MAP relevance information to the MS in a #l DL subbframe of a #i frame. The MS extracts necessary information by decoding the assignment information. The MS determines the frame and subframe indexes of each HARQ operation based on the frame and subframe indexes of the previous HARQ operation according to at least one of the afore-described exemplary embodiments of the present invention.

In step 1908, the MS transmits a UL HARQ burst in a #h subframe of a #a frame according to the assignment information and the BS decodes the UL HARQ burst based on the assignment information. The BS transmits an HARQ feedback for the UL HARQ burst according to the decoding result, or the next assignment information to the MS in a #f subframe of a #b frame in step 1910. If the HARQ feedback is a NACK signal, the UL HARQ burst may be retransmitted in the #h subframe of a #c frame according to a predefined transmission period in step 1912.

In order to implement at least one of the above exemplary embodiments of the present invention, each of the BS and the MS includes a controller configured with a processor, a memory for storing program codes and related parameters necessary for operations of the controller, and a transmitter and receiver for exchanging signaling messages or data traffic with the other party under the control of the controller. The controller controls HARQ timings to perform the operations of the transmitter and receiver according to at least one of the afore-described exemplary embodiments of the present invention.

As is apparent from the above description, the exemplary embodiments of the present invention enable flexible HARQ transmissions according to a different frame configuration method for a different system bandwidth, and a DL-to-UL ratio, a legacy system supporting scheme, because HARQ Tx timings are flexibly set in a wireless mobile communication system.

The above synchronized relationship reduces the number of subframes that a receiver should monitor, thereby saving power. Further, an MS can communicate with another system more freely using predefined operation timings.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing a Hybrid Automatic Repeat reQuest (HARQ) operation in a wireless mobile communication system that uses frames each having a plurality of subframes for communication, the method comprising:

determining an HARQ timing according to data burst assignment information transmitted in a #l DownLink (DL) subframe of a #i frame, the HARQ timing including transmission time of a DL data burst and a transmission time of an HARQ feedback, for DL HARQ; and performing an HARQ operation according to the determined HARQ timing, wherein at least one frame index and at least one subframe index that represent the HARQ timing are determined by using l and i.

2. The method of claim 1, wherein, when a Frequency Division Duplex (FDD) mode is used, the HARQ timing is determined by equations of the following table or a table having result values according to the equations of the following table,

| Content | Subframe Index | Frame Index |
|---|---|---|
| Assignment Advanced-MAP (A-MAP) Information Element (IE) Tx in DL | l | i |
| HARQ Subpacket Tx in DL | m = l | i |
| HARQ feedback in UpLink (UL) | n = ceil(m + F/2)mod F | $j = \left(i + \text{floor}\left(\frac{\text{ceil}(m + F/2)}{F}\right) + z\right) \mod N$ | where l denotes an index of a subframe carrying an assignment A-MAP IE including the data burst assignment information, i denotes an index of a frame carrying the assignment A-MAP IE, m denotes an index of a subframe in which a transmission of an HARQ subpacket corresponding to the data burst starts, n denotes an index of a subframe carrying the HARQ feedback, j denotes an index of a frame carrying the HARQ feedback, F denotes the number of subframes per frame, N denotes the number of frames per superframe and is 4, if each superframe has four frames, and z denotes a DL HARQ feedback offset.

3. The method of claim 2, wherein the DL HARQ feedback offset z is determined according to a data burst processing time of the HARQ subpacket burst by the following equation, $$z = \begin{cases} 0, & \text{for } \text{ceil}(F/2) - N_{TTI} \geq \text{Rx\_time} \\ 1, & \text{for } \text{ceil}(F/2) - N_{TTI} < \text{Rx\_time} \end{cases}$$

where ceil( ) represents a ceiling function, $N_{TTI}$ denotes the number of subframes that the HARQ subpacket spans, and Rx_time denotes the data burst processing time.

4. The method of claim 2, wherein a retransmission of the data burst corresponding to the HARQ feedback starts in a subframe with the same index m after a predefined number of frames from the transmission of the data burst.

5. The method of claim 2, wherein the performing of the HARQ operation comprises:
transmitting the HARQ subpacket that starts in the #m DL subframe of the #i frame to a Mobile Station (MS) by a Base Station (BS); and
receiving the HARQ feedback for the HARQ subpacket in the #n UL subframe of the #j frame from the MS by the BS.

6. The method of claim 2, wherein the performing of the HARQ operation comprises:
receiving the HARQ subpacket that starts in the #m DL subframe of the #i frame from a BS by an MS; and
transmitting the HARQ feedback for the HARQ subpacket in the #n UL subframe of the #j frame to the BS by the MS.

7. The method of claim 1, wherein, when a FDD mode is used and a long Time Transmission Interval (TTI) in which the data burst occupies two or more subframes, the HARQ timing is determined by the following equations or a table having result values according to the following equations, $$m = \begin{cases} x_1^i & 0 \leq l \leq x_1 \\ x_2^i & x_1 < l \leq x_2 \\ \vdots & \vdots \\ x_{max}^i & x_{max-1} \leq l \leq x_{max} \\ x_1^{i+1} & x_{max} < l < F \end{cases}$$

$$n = \text{ceil}(l + F/2) \bmod F$$

$$j = \left(i + \text{floor}\left(\frac{\text{ceil}(m + F/2)}{F}\right) + z\right) \bmod N$$

$$z = \begin{cases} 0 & \text{if}(\text{ceil}(F/2) - N_{TTI} + (m - l)) \geq \text{Processing time} \\ 1 & \text{else} \end{cases}$$

where l denotes an index of a subframe carrying an assignment A-MAP IE including the data burst assignment information, i denotes an index of a frame carrying the assignment A-MAP IE, m denotes an index of a subframe in which a transmission of an HARQ subpacket corresponding to the data burst starts, n denotes an index of a subframe carrying the HARQ feedback, j denotes an index of a frame carrying the HARQ feedback, F denotes the number of subframes per frame, N denotes the number of frames per superframe and is 4, if each superframe has four frames, z denotes a DL HARQ feedback offset, and $x_n^i$ denotes a #$x_n$ subframe of a #i frame.

8. The method of claim 2, wherein, when a Time Division Duplex (TDD) mode is used, the HARQ timing is determined by equations of the following table or a table having result values according to the equations of the following table,

| Content | Subframe index | Frame index |
|---|---|---|
| Assignment Advanced-MAP (A-MAP) Information Element (IE) Tx in DL | l | i |
| HARQ Subpacket Tx in DL | m = 1 | i |
| HARQ feedback in UL | For D > U, $n = \begin{cases} 0, & \text{for } 0 \leq m < K \\ m - K, & \text{for } K \leq m < U + K \\ U - 1, & \text{for } U + K \leq m < D \end{cases}$ <br> For D ≤ U, n = m − K | j = (i + z) mod N | where the frame each has D DownLink (DL) subframes and U UpLink (UL) subframes, l denotes an index of a subframe carrying an assignment A-MAP) IE including the data burst assignment information, ranging from 0 to D−1, i denotes an index of a frame carrying the assignment A-MAP IE, m denotes an index of a subframe in which a transmission of an HARQ subpacket corresponding to the data burst starts, n denotes an index of a subframe carrying the HARQ feedback, j denotes an index of a frame carrying the HARQ feedback, N denotes the number of frames per superframe and is 4, if each superframe has four frames, z denotes a DL HARQ feedback offset, if D is smaller than U, K is calculated by −ceil{(U−D)/2}, and if D is equal to or greater than U, K is calculated by floor{(D−U)/2}.

9. The method of claim 8, wherein the DL HARQ feedback offset z is determined according to a data burst processing time of the HARQ subpacket burst by the following equation, $$z = \begin{cases} 0, & \text{for } D - m - N_{TTI} + n \geq \text{Rx\_time} \\ 1, & \text{for } D - m - N_{TTI} + n < \text{Rx\_time} \end{cases}$$

where $N_{TTI}$ denotes the number of subframes that the HARQ subpacket spans, and Rx_time denotes the data burst processing time.

10. The method of claim 8, wherein a retransmission of the data burst corresponding to the HARQ feedback starts at a subframe having the subframe index m after a predetermined number of frames from a transmission of the data burst.

11. The method of claim 8, wherein if the subframe indexes l, m and n are used as DL subframe indexes, each of the subframe indexes l, m and n ranges from 0 to D−1, D being the number of DL subframes defined in a period except a period supporting a legacy system in each frame, if the subframe indexes l, m and n are used as UL subframe indexes, each of the subframe indexes l, m and n ranges from 0 to U−1, U being the number of UL subframes defined in a period except a period supporting a legacy system in each frame, and the frame indexes are calculated by a subframe index order corresponding to an entire duration including a period supporting a legacy system within each frame.

12. The method of claim 8, wherein if the subframe indexes l, m and n are used as DL subframe indexes, the DL subframe indexes are reordered indexes for DL subframes used for communication from a Relay Station (RS) to an MS, if the subframe indexes l, m and n are used as UL subframe indexes, the UL subframe indexes are reordered indexes for UL subframes used for communication from the MS to the RS, and the frame indexes are calculated by a subframe index order corresponding to an entire duration used for a communications with the RS within each frame.

13. The method of claim 8, wherein the performing of the HARQ operation comprises:

transmitting the HARQ subpacket that starts in the #$m^{th}$ DL subframe of the #i frame to a Mobile Station (MS) by a Base Station (BS); and receiving the HARQ feedback for the HARQ subpacket in the #n UL subframe of the #j frame from the MS by the BS.

14. The method of claim 8, wherein the performing of the HARQ operation comprises:

receiving the HARQ subpacket that starts in the #m DL subframe of the #i frame from a BS by an MS; and transmitting the HARQ feedback for the HARQ subpacket in the #n UL subframe of the #j frame to the BS by the MS.

15. The method of claim 1, wherein if an assignment A-MAP IE including the data burst assignment information indicates a long Transmission Time Interval (TTI) transmission and l is not 0 on a TDD mode, transmission of an HARQ subpacket corresponding to the data burst starts in a #0 DL subframe of an #(i+1) frame and the HARQ feedback for the HARQ subpacket is transmitted in an #n' UL subframe of a #j' frame, and wherein the long TTI transmission means that the HARQ subpacket spans two or more subframes and the subframe index n' and the frame index j' are determined by the following equations or a table having result values according to the following equations, $$n' = \begin{cases} 0, & \text{for } 0 \leq l < K \\ l - K, & \text{for } K \leq l < U + K, \text{For } D > U \\ U - 1, & \text{for } U + K \leq l < D \end{cases}$$

$$n' = l - K, \text{For } D \leq U$$

$$j' = ((i+1) + z) \mod N.$$

16. A method for performing a Hybrid Automatic Repeat reQuest (HARQ) operation in a wireless mobile communication system that uses frames each having a plurality of subframes for communication, the method comprising:

determining an HARQ timing according to data burst assignment information transmitted in a #l DownLink (DL) subframe of a #i frame, the HARQ timing including transmission time of a UpLink (UL) data burst, a transmission time of an HARQ feedback, and a retransmission time of the data burst, for UL HARQ; and performing an HARQ operation according to the determined HARQ timing, wherein at least one frame index and at least one subframe index that represent the HARQ timing are determined by using l and i.

17. The method of claim 16, wherein, when a Frequency Division Duplex (FDD) mode is used, the HARQ timing is determined by equations of the following table or a table having result values according to the equations of the following table,

| Content | Subframe index | Frame index |
|---|---|---|
| Assignment Advanced-MAP (A-MAP) Information Element (IE) Tx in DL | l | i |
| HARQ Subpacket Tx in UpLink (UL) | m = n where n = ceil (l + F/2) mod F | $j = \left(i + \text{floor}\left(\frac{\text{ceil}(l + F/2)}{F}\right) + v\right) \mod N$ |
| HARQ feedback in DL | l | $k = \left(j + \text{floor}\left(\frac{m + F/2}{F}\right) + w\right) \mod N$ | where l denotes an index of a subframe carrying an assignment A-MAP IE including the data burst assignment information, i denotes an index of a frame carrying the assignment A-MAP IE, m denotes an index of a subframe in which a transmission of an HARQ subpacket corresponding to the data burst starts, j denotes an index of a frame carrying the HARQ feedback, F denotes the number of subframes per frame, N denotes the number of frames per superframe and is 4, if each superframe has four frames, k denotes an index of a frame carrying the HARQ feedback, v denotes a UL HARQ transmission offset, and w denotes a UL HARQ feedback offset.

18. The method of claim 17, wherein the UL HARQ transmission offset v and the UL HARQ feedback offset w are determined according to a data burst processing time of the HARQ subpacket burst by the following equations or a table having result values according to the following equations, $$v = \begin{cases} 0, & \text{for ceil}(F/2) - 1 \geq \text{Rx\_time} \\ 1, & \text{for ceil}(F/2) - 1 < \text{Rx\_time} \end{cases}$$

$$w = \begin{cases} 0, & \text{for floor } (F/2) - N_{TTI} \geq \text{Rx\_time} \\ 1, & \text{for floor } (F/2) - N_{TTI} < \text{Rx\_time} \end{cases}$$

where ceil( ) represents a ceiling function, floor( ) represents a floor function, $N_{TTI}$ denotes the number of subframes that the HARQ subpacket spans, and Rx_time denotes the data burst processing time.

19. The method of claim 17, wherein a retransmission of the data burst corresponding to the HARQ feedback starts at a time determined by an equation of the following table or a table having result values according to the equation of the following table,

| Content | Subframe index | Frame index |
|---|---|---|
| HARQ subpacket ReTx in UL | m | $p = \left(k + \text{floor}\left(\frac{\text{ceil}(l + F/2)}{F}\right) + v\right) \mod N$ | where p denotes an index of a frame in which the retransmission of the data burst starts, if the HARQ feedback is a Negative ACKnowledgement (NACK), v denotes the UL HARQ transmission offset, and w denotes the UL HARQ feedback offset.

20. The method of claim 17, wherein the performing of the HARQ operation comprises:

receiving the HARQ subpacket that starts in the #m UL subframe of the #j frame from a Mobile Station (MS) by a Base Station (BS);

transmitting the HARQ feedback for the HARQ subpacket in the #l DownLink (DL) subframe of the #k frame to the MS by the BS; and receiving a retransmission of the HARQ packet, which starts in the #m UL subframe of the #p frame from the MS by the BS.

21. The method of claim 17, wherein the performing of the HARQ operation comprises:

transmitting the HARQ subpacket that starts in the #m UL subframe of the #j frame to a BS by an MS;

receiving the HARQ feedback for the HARQ subpacket in the #l DL subbframe of the #k frame from the BS by the MS; and retransmitting the HARQ packet, starting from the #m UL subframe of the #p frame to the BS by the MS.

22. The method of claim 16, wherein, when a FDD mode is used and a long Time Transmission Interval (TTI) in which the data burst occupies two or more subframes, the HARQ timing is determined by the following equations or a table having result values according to the following equations, $$m \begin{cases} y_1^i & 0 \leq n \leq y_1 \\ y_2^i & y_1 < n \leq y_2 \\ \vdots & \vdots \\ y_{max}^i & y_{max-1} < n \leq y_{max} \\ y_1^{i+1} & y_{max} < n < F \end{cases}$$

$$n = \text{ceil}(l + F/2) \bmod F$$

$$j = \left(i + \text{floor}\left(\frac{\text{ceil}(l + F/2)}{F}\right) + v\right) \bmod N$$

$$v = \begin{cases} 0 & \text{if}(\text{ceil}(F/2) - 1 + (m - n)) \geq \\ & \text{Processing time} \\ 1 & \text{else} \end{cases}$$

$$k = \left(j + \text{floor}\left(\frac{\text{ceil}(n + F/2)}{F}\right) + w\right) \bmod N$$

$$p = \left(k + \text{floor}\left(\frac{\text{ceil}(l + F/2)}{F}\right) + v\right) \bmod N$$

$$w = \begin{cases} 0 & \text{if}(\text{floor}(F/2) - N_{TTI} + (n - m)) \geq \\ & \text{Processing time} \\ 1 & \text{else} \end{cases}$$

where l denotes an index of a subframe carrying an assignment A-MAP IE including the data burst assignment information, i denotes an index of a frame carrying the assignment A-MAP IE, m denotes an index of a subframe in which a transmission of an HARQ subpacket corresponding to the data burst starts, n denotes an index of a subframe carrying the HARQ feedback, j denotes an index of a frame carrying the HARQ feedback, F denotes the number of subframes per frame, N denotes the number of frames per superframe and is 4, if each superframe has four frames, p denotes an index of a frame in which the retransmission of the data burst starts, if the HARQ feedback is a NACK, v denotes a UL HARQ feedback offset, and $y_n^i$ denotes a #$y_n$ subframe of a #i frame.

23. The method of claim 16, wherein, when a Time Division Duplex (TDD) mode is used, the HARQ timing is determined by equations of the following table or a table having result values according to the equations of the following table,

| Content | Subframe index | Frame index |
|---|---|---|
| Assignment Advanced-MAP (A-MAP) Information Element (IE) Tx in DL | l | i |
| HARQ Subpacket Tx in UL | For D ≥ U | j = (i + v) mod 4 |
| HARQ feedback in DL | $m = \begin{cases} 0, & \text{for } 0 \leq l < K \\ l - K, & \text{for } K \leq l < U \\ U - 1, & \text{for } U + K \leq l \end{cases}$ | $k = \left(j + \text{floor}\left(\frac{m + F/2}{F}\right) + w\right) \bmod N$ | where the frame each has D DownLink (DL) subframes and U UpLink (UL) subframes, l denotes an index of a subframe carrying an assignment A-MAP IE including the data burst assignment information, ranging from 0 to D−1, i denotes an index of a frame carrying the assignment A-MAP IE, m denotes an index of a subframe in which a transmission of an HARQ subpacket corresponding to the data burst starts, n denotes an index of a subframe carrying the HARQ feedback, j denotes an index of a frame carrying the HARQ feedback, N denotes the number of frames per superframe and is 4, if each superframe has four frames, k denotes an index of a frame carrying the HARQ feedback, v denotes a UL HARQ transmission offset, w denotes a UL HARQ feedback offset, if D is smaller than U, K is calculated by −ceil{(U−D)/2} and if D is equal to or greater than U, K is calculated by floor {(D−U)/2}.

24. The method of claim 23, wherein the UL HARQ transmission offset v and the UL HARQ feedback offset w are determined according to a data burst processing time of the HARQ subpacket burst by the following equations, $$v = \begin{cases} 0, & \text{for } D - l - 1 + m \geq \text{Tx\_time} \\ 1, & \text{for } D - l - 1 + m < \text{Tx\_time} \end{cases}$$

-continued $$w = \begin{cases} 0, & \text{for } U - m - N_{TTI} + l \geq \text{Rx\_time} \\ 1, & \text{for } U - m - N_{TTI} + l < \text{Rx\_time} \end{cases}$$

where $N_{TTI}$ denotes the number of subframes that the HARQ subpacket spans, and each of Tx_Time and Rx_Time denotes the data burst processing time.

25. The method of claim 23, wherein a retransmission of the data burst corresponding to the HARQ feedback starts at a time determined by the following table,

| Content | Subframe index | Frame index |
| --- | --- | --- |
| HARQ Subpacket ReTx in UL | m | p = (k + v) mod 4 | where p denotes an index of a frame in which the retransmission of the data burst starts, if the HARQ feedback is a Negative ACKnowledgement (NACK).

26. The method of claim 23, wherein if the subframe indexes l, m and n are used as DL subframe indexes, each of the subframe indexes l, m and n ranges from 0 to D−1, D being the number of DL subframes defined in a period except a period supporting a legacy system in each frame, if the subframe indexes l, m and n are used as UL subframe indexes, each of the subframe indexes l, m and n ranges from 0 to U−1, U being the number of UL subframes defined in a period except a period supporting a legacy system in each frame, and the frame indexes are calculated by a subframe index order corresponding to an entire duration including a period supporting a legacy system within each frame.

27. The method of claim 23, wherein if the subframe indexes l, m and n are used as DL subframe indexes, the DL subframe indexes are reordered indexes for DL subframes used for communication from a Relay Station (RS) to an MS, if the subframe indexes l, m and n are used as UL subframe indexes, the UL subframe indexes are reordered indexes for UL subframes used for communication from the MS to the RS, and the frame indexes are calculated by a subframe index order corresponding to an entire duration used for a communications with the RS within each frame.

28. The method of claim 23, wherein the performing of the HARQ operation comprises:
receiving the HARQ subpacket that starts in the #m UL subframe of the #j frame from a Mobile Station (MS) by a Base Station (BS);
transmitting the HARQ feedback for the HARQ subpacket in the #l DL subframe of the #k frame to the MS by the BS; and
receiving a retransmission of the HARQ subpacket, starting from the #m UL subframe of the #p frame from the MS by the BS.

29. The method of claim 23, wherein the performing of the HARQ operation comprises:
transmitting the HARQ subpacket that starts in the #m UL subframe of the #j frame to a BS by an MS;
receiving the HARQ feedback for the HARQ subpacket in the #l DL subbframe of the #k frame from the BS by the MS; and
retransmitting the HARQ subpacket, starting from the #m UL subframe of the #p frame to BS by the MS.

30. The method of claim 16, wherein if an assignment A-MAP IE including the data burst assignment information indicates a long Transmission Time Interval (TTI) transmission on a TDD mode, transmission of an HARQ subpacket corresponding to the data burst starts in a #0 UL subframe of a #j frame and the HARQ feedback for the HARQ subpacket is transmitted in an #1 UL subframe of a #p frame, and
wherein the long TTI transmission means that the HARQ subpacket spans two or more subframes.

31. An apparatus for performing a Hybrid Automatic Repeat reQuest (HARQ) operation in a wireless mobile communication system that uses frames each having a plurality of subframes for communication, the apparatus comprising:
a controller for determining an HARQ timing according to data burst assignment information transmitted in a #l DownLink (DL) subframe of a #i frame, the HARQ timing including transmission time of a DL data burst and a transmission time of an HARQ feedback, for DL HARQ; and
a transcevier for performing an HARQ operation according to the determined HARQ timing,
wherein at least one frame index and at least one subframe index that represent the HARQ timing are determined by using l and i.

32. The apparatus of claim 31, wherein, when a Frequency Division Duplex (FDD) mode is used, the controller determines the HARQ timing by equations of the following table or a table having result values according to the equations of the following table,

| Content | Subframe index | Frame index |
| --- | --- | --- |
| Assignment Advanced-MAP (A-MAP) Information Element (IE) Tx in DL | l | i |
| HARQ Subpacket Tx in DL | m = l | i |
| HARQ feedback in UpLink (UL) | n = ceil(m + F/2)mod F | $j = \left(i + \text{floor}\left(\frac{\text{ceil}(m + F/2)}{F}\right) + z\right) \mod N$ | where l denotes an index of a subframe carrying an assignment A-MAP IE including the data burst assignment information, i denotes an index of a frame carrying the assignment A-MAP IE, m denotes an index of a subframe in which a transmission of an HARQ subpacket corresponding to the data burst starts, n denotes an index of a subframe carrying the HARQ feedback, j denotes an index of a frame carrying the HARQ feedback, F denotes the number of subframes per frame, N denotes the number of frames per superframe and is 4, if each superframe has four frames, and z denotes a DL HARQ feedback offset.

33. The apparatus of claim 32, wherein the DL HARQ feedback offset z is determined according to a data burst processing time of the HARQ subpacket burst by the following equation, $$z = \begin{cases} 0, & \text{for } \operatorname{ceil}(F/2) - N_{TTI} \geq \text{Rx\_time} \\ 1, & \text{for } \operatorname{ceil}(F/2) - N_{TTI} < \text{Rx\_time} \end{cases}$$

where ceil( ) represents a ceiling function, $N_{TTI}$ denotes the number of subframes that the HARQ subpacket spans, and Rx_time denotes the data burst processing time.

34. The apparatus of claim 32, wherein a retransmission of the data burst corresponding to the HARQ feedback starts in a subframe with the same index m after a predefined number of frames from the transmission of the data burst.

35. The apparatus of claim 32, wherein, when the HARQ operation is performed in a Base Station (BS), the transceiver transmits the HARQ subpacket that starts in the #m DL subframe of the #i frame to a Mobile Station (MS), and receives the HARQ feedback for the HARQ subpacket in the #n UL subframe of the #j frame from the MS.

36. The apparatus of claim 32, wherein, when the HARQ operation is performed in a Mobile Station (MS), the transceiver receives the HARQ subpacket that starts in the #m DL subframe of the #i frame from a Base Station (BS), and transmits the HARQ feedback for the HARQ subpacket in the #n UL subframe of the #j frame to the BS.

37. The apparatus of claim 31, wherein, when a FDD mode is used and a long Time Transmission Interval (TTI) in which the data burst occupies two or more subframes, the HARQ timing is determined by the following equations or a table having result values according to the following equations, $$m = \begin{cases} x_1^i & 0 \leq l \leq x_1 \\ x_2^i & x_1 < l \leq x_2 \\ \vdots & \vdots \\ x_{max}^i & x_{max-1} \leq l \leq x_{max} \\ x_1^{i+1} & x_{max} < l < F \end{cases}$$

$$n = \operatorname{ceil}(l + F/2) \bmod F$$

$$j = \left(i + \operatorname{floor}\left(\frac{\operatorname{ceil}(m + F/2)}{F}\right) + z\right) \bmod N$$

$$z = \begin{cases} 0 & \text{if } (\operatorname{ceil}(F/2) - N_{TTI} + (m - l)) \geq \text{Processing time} \\ 1 & \text{else} \end{cases}$$

where l denotes an index of a subframe carrying an assignment A-MAP IE including the data burst assignment information, i denotes an index of a frame carrying the assignment A-MAP IE, m denotes an index of a subframe in which a transmission of an HARQ subpacket corresponding to the data burst starts, n denotes an index of a subframe carrying the HARQ feedback, j denotes an index of a frame carrying the HARQ feedback, F denotes the number of subframes per frame, N denotes the number of frames per superframe and is 4, if each superframe has four frames, z denotes a DL HARQ feedback offset, and $x_n^i$ denotes a $\#x_n$ subframe of a #i frame.

38. The apparatus of claim 32, wherein, when a Time Division Duplex (TDD) mode is used, the HARQ timing is determined by equations of the following table or a table having result values according to the equations of the following table,

| Content | Subframe index | Frame index |
|---|---|---|
| Assignment Advanced-MAP (A-MAP) Information Element (IE) Tx in DL | l | i |
| HARQ Subpacket Tx in DL | m = l | i |
| HARQ feedback in UL | For D > U, $n = \begin{cases} 0, & \text{for } 0 \leq m < K \\ m - K, & \text{for } K \leq m < U + K \\ U - 1, & \text{for } U + K \leq m < D \end{cases}$ For $D \leq U$, $n = m - K$ | j = (i + z) mod N | where the frame each has D DownLink (DL) subframes and U UpLink (UL) subframes, l denotes an index of a subframe carrying an assignment A-MAP) IE including the data burst assignment information, ranging from 0 to D−1, i denotes an index of a frame carrying the assignment A-MAP IE, m denotes an index of a subframe in which a transmission of an HARQ subpacket corresponding to the data burst starts, n denotes an index of a subframe carrying the HARQ feedback, j denotes an index of a frame carrying the HARQ feedback, N denotes the number of frames per superframe and is 4, if each superframe has four frames, z denotes a DL HARQ feedback offset, if D is smaller than U, K is calculated by −ceil{(U−D)/2}, and if D is equal to or greater than U, K is calculated by floor{(D−U)/2}.

39. The apparatus of claim 38, wherein the DL HARQ feedback offset z is determined according to a data burst processing time of the HARQ subpacket burst by the following equation, $$z = \begin{cases} 0, & \text{for } D - m - N_{TTI} + n \geq \text{Rx\_time} \\ 1, & \text{for } D - m - N_{TTI} + n < \text{Rx\_time} \end{cases}$$

where $N_{TTI}$ denotes the number of subframes that the HARQ subpacket spans, and Rx_time denotes the data burst processing time.

40. The apparatus of claim 38, wherein a retransmission of the data burst corresponding to the HARQ feedback starts at a subframe having the subframe index m after a predetermined number of frames from a transmission of the data burst.

41. The apparatus of claim 38, wherein, if the subframe indexes l, m and n are used as DL subframe indexes, each of the subframe indexes l, m and n ranges from 0 to D−1, D being the number of DL subframes defined in a period except a period supporting a legacy system in each frame, if the subframe indexes l, m and n are used as UL subframe indexes, each of the subframe indexes l, m and n ranges from 0 to U−1, U being the number of UL subframes defined in a period except a period supporting a legacy system in each frame, and the frame indexes are calculated by a subframe index order corresponding to an entire duration including a period supporting a legacy system within each frame.

42. The apparatus of claim 38, wherein, if the subframe indexes l, m and n are used as DL subframe indexes, the DL subframe indexes are reordered indexes for DL subframes used for communication from a Relay Station (RS) to an MS, if the subframe indexes l, m and n are used as UL subframe indexes, the UL subframe indexes are reordered indexes for UL subframes used for communication from the MS to the RS, and the frame indexes are calculated by a subframe index order corresponding to an entire duration used for a communications with the RS within each frame.

43. The apparatus of claim 38, wherein, when the HARQ operation is performed in a Base Station (BS), the transceiver transmits the HARQ subpacket that starts in the #$m^{th}$ DL subframe of the #i frame to a Mobile Station (MS), and receives the HARQ feedback for the HARQ subpacket in the #n UL subframe of the #j frame from the MS.

44. The apparatus of claim 38, wherein, when the HARQ operation is performed in a Mobile Station (MS), the transceiver receives the HARQ subpacket that starts in the #m DL subframe of the #i frame from a Base Station (BS), and transmits the HARQ feedback for the HARQ subpacket in the #n UL subframe of the #j frame to the BS.

45. The apparatus of claim 31, wherein, if an assignment A-MAP IE including the data burst assignment information indicates a long Transmission Time Interval (TTI) transmission and l is not 0 on a TDD mode, transmission of an HARQ subpacket corresponding to the data burst starts in a #0 DL subframe of an #(i+1) frame and the HARQ feedback for the HARQ subpacket is transmitted in an #n' UL subframe of a #j' frame, and wherein the long TTI transmission means that the HARQ subpacket spans two or more subframes and the subframe index n' and the frame index j' are determined by the following equations or a table having result values according to the following equations, $$n' = \begin{cases} 0, & \text{for } 0 \leq l < K \\ l - K, & \text{for } K \leq l < U + K, \text{ For } D > U \\ U - 1, & \text{for } U + K \leq l < D \end{cases}$$

$$n' = l - K, \text{ For } D \leq U$$

$$j' = ((i+1) + z) \bmod N.$$

46. An apparatus for performing a Hybrid Automatic Repeat reQuest (HARQ) operation in a wireless mobile communication system that uses frames each having a plurality of subframes for communication, the apparatus comprising:

a controller for determining an HARQ timing according to data burst assignment information transmitted in a #l DownLink (DL) subframe of a #i frame, the HARQ timing including transmission time of a UpLink (UL) data burst, a transmission time of an HARQ feedback, and a retransmission time of the data burst, for UL HARQ; and a transceiver for performing an HARQ operation according to the determined HARQ timing, wherein at least one frame index and at least one subframe index that represent the HARQ timing are determined by using l and i.

47. The apparatus of claim 46, wherein, when a Frequency Division Duplex (FDD) mode is used, the HARQ timing is determined by equations of the following table or a table having result values according to the equations of the following table,

| Content | Sub frame index | index |
|---|---|---|
| Assignment Advanced-MAP (A-MAP) Information Element (IE) Tx in DL | l | i |
| HARQ Subpacket Tx in UpLink (UL) | m = n where n = ceil(l + F/2)modF | $j = \left(i + \text{floor}\left(\frac{\text{ceil}(l + F/2)}{F}\right) + v\right) \bmod N$ |
| HARQ feedback in DL | l | $k = \left(j + \text{floor}\left(\frac{m + F/2}{F}\right) + w\right) \bmod N$ | where l denotes an index of a subframe carrying an assignment A-MAP IE including the data burst assignment information, i denotes an index of a frame carrying the assignment A-MAP IE, m denotes an index of a subframe in which a transmission of an HARQ subpacket corresponding to the data burst starts, j denotes an index of a frame carrying the HARQ feedback, F denotes the number of subframes per frame, N denotes the number of frames per superframe and is 4, if each superframe has four frames, k denotes an index of a frame carrying the HARQ feedback, v denotes a UL HARQ transmission offset, and w denotes a UL HARQ feedback offset.

48. The apparatus of claim 47, wherein the UL HARQ transmission offset v and the UL HARQ feedback offset w are determined according to a data burst processing time of the HARQ subpacket burst by the following equations or a table having result values according to the following equations, $$v = \begin{cases} 0, & \text{for ceil}(F/2) - 1 \geq \text{Rx\_time} \\ 1, & \text{for ceil}(F/2) - 1 < \text{Rx\_time} \end{cases}$$

$$w = \begin{cases} 0, & \text{for floor}(F/2) - N_{TTI} \geq \text{Rx\_time} \\ 1, & \text{for floor}(F/2) - N_{TTI} < \text{Rx\_time} \end{cases}$$

where ceil( ) represents a ceiling function, floor( ) represents a floor function, $N_{TTI}$ denotes the number of subframes that the HARQ subpacket spans, and Rx_time denotes the data burst processing time.

49. The apparatus of clam 47, wherein a retransmission of the data burst corresponding to the HARQ feedback starts at a time determined by an equation of the following table or a table having result values according to the equation of the following table,

| Content | Subframe index | Frame index |
| --- | --- | --- |
| HARQ subpacket ReTx in UL | m | $p = \left(k + \text{floor}\left(\frac{\text{ceil}(l + F/2)}{F}\right) + v\right) \bmod N$ | where p denotes an index of a frame in which the retransmission of the data burst starts, if the HARQ feedback is a Negative ACKnowledgement (NACK), v denotes the UL HARQ transmission offset, and w denotes the UL HARQ feedback offset.

50. The apparatus of claim 47, wherein, when the HARQ operation is performed in a Base Station (BS), the transceiver receives the HARQ subpacket that starts in the #m UL subframe of the #j frame from a Mobile Station (MS), transmits the HARQ feedback for the HARQ subpacket in the #l Down-Link (DL) subframe of the #k frame to the MS, and receives a retransmission of the HARQ packet, which starts in the #m UL subframe of the #p frame from the MS.

51. The apparatus of claim 47, wherein, when the HARQ operation is performed in a Mobile Station (MS), the transceiver transmits the HARQ subpacket that starts in the #m UL subframe of the #j frame to a Base Station (BS), receives the HARQ feedback for the HARQ subpacket in the #l DL subframe of the #k frame from the BS, and retransmits the HARQ packet, starting from the #m UL subframe of the #p frame to the BS.

52. The apparatus of claim 46, wherein, when a FDD mode is used and a long Time Transmission Interval (TTI) in which the data burst occupies two or more subframes, the HARQ timing is determined by the following equations or a table having result values according to the following equations, $$m = \begin{cases} y_1^i & 0 \leq n \leq y_1 \\ y_2^i & y_1 < n \leq y_2 \\ \vdots & \vdots \\ y_{max}^i & y_{max-1} < n \leq y_{max} \\ y_1^{i+1} & y_{max} < n < F \end{cases}$$

$$n = \text{ceil}(l + F/2) \bmod F$$

$$j = \left(i + \text{floor}\left(\frac{\text{ceil}(l + F/2)}{F}\right) + v\right) \bmod N$$

$$v = \begin{cases} 0 & \text{if } (\text{ceil}(F/2) - 1 + (m - n)) \geq \text{Processing time} \\ 1 & \text{else} \end{cases}$$

$$k = \left(j + \text{floor}\left(\frac{\text{ceil}(n + F/2)}{F}\right) + w\right) \bmod N$$

$$p = \left(k + \text{floor}\left(\frac{\text{ceil}(l + F/2)}{F}\right) + v\right) \bmod N$$

$$w = \begin{cases} 0 & \text{if } (\text{floor}(F/2) - N_{TTI} + (n - m)) \geq \text{Processing time} \\ 1 & \text{else} \end{cases}$$

where l denotes an index of a subframe carrying an assignment A-MAP IE including the data burst assignment information, i denotes an index of a frame carrying the assignment A-MAP IE, m denotes an index of a subframe in which a transmission of an HARQ subpacket corresponding to the data burst starts, n denotes an index of a subframe carrying the HARQ feedback, j denotes an index of a frame carrying the HARQ feedback, F denotes the number of subframes per frame, N denotes the number of frames per superframe and is 4, if each superframe has four frames, p denotes an index of a frame in which the retransmission of the data burst starts, if the HARQ feedback is a NACK, v denotes a UL HARQ feedback offset, and $y_n^i$ denotes a #$y_n$ subframe of a #i frame.

53. The apparatus of claim 46, wherein, when a Time Division Duplex (TDD) mode is used, the HARQ timing is determined by equations of the following table or a table having result values according to the equations of the following table,

| Content | Subframe index | Frame index |
|---|---|---|
| Assignment Advanced-MAP (A-MAP) Information Element (IE) Tx in DL | l | i |
| HARQ Subpacket | For D ≥ U | j = (i + v) mod 4 |
| HARQ feedback in DL | $m = \begin{cases} 0, & \text{for } 0 \leq l < K \\ l - K, & \text{for } K \leq l < U \\ U - 1, & \text{for } U + K \leq l \end{cases}$ | $k = \left(j + \text{floor}\left(\frac{m + F/2}{F}\right) + w\right) \bmod N$ | where the frame each has D DownLink (DL) subframes and U UpLink (UL) subframes, l denotes an index of a subframe carrying an assignment A-MAP IE including the data burst assignment information, ranging from 0 to D−1, i denotes an index of a frame carrying the assignment A-MAP IE, m denotes an index of a subframe in which a transmission of an HARQ subpacket corresponding to the data burst starts, n denotes an index of a subframe carrying the HARQ feedback, j denotes an index of a frame carrying the HARQ feedback, N denotes the number of frames per superframe and is 4, if each superframe has four frames, k denotes an index of a frame carrying the HARQ feedback, v denotes a UL HARQ transmission offset, w denotes a UL HARQ feedback offset, if D is smaller than U, K is calculated by −ceil{(U−D)/2} and if D is equal to or greater than U, K is calculated by floor{(D−U)/2}.

54. The apparatus of claim 53, wherein the UL HARQ transmission offset v and the UL HARQ feedback offset w are determined according to a data burst processing time of the HARQ subpacket burst by the following equations, $$v = \begin{cases} 0, & \text{for } D - l - 1 + m \geq \text{Tx\_time} \\ 1, & \text{for } D - l - 1 + m < \text{Tx\_time} \end{cases}$$

$$w = \begin{cases} 0, & \text{for } U - m - N_{TTI} + l \geq \text{Rx\_time} \\ 1, & \text{for } U - m - N_{TTI} + l < \text{Rx\_time} \end{cases}$$

where $N_{TTI}$ denotes the number of subframes that the HARQ subpacket spans, and each of Tx_Time and Rx_Time denotes the data burst processing time.

55. The apparatus of claim 53, wherein a retransmission of the data burst corresponding to the HARQ feedback starts at a time determined by the following table,

| Content | Subframe index | Frame index |
|---|---|---|
| HARQ Subpacket ReTx in UL | m | p = (k + v) mod 4 | where p denotes an index of a frame in which the retransmission of the data burst starts, if the HARQ feedback is a Negative ACKnowledgement (NACK).

56. The apparatus of claim 53, wherein if the subframe indexes l, m and n are used as DL subframe indexes, each of the subframe indexes l, m and n ranges from 0 to D−1, D being the number of DL subframes defined in a period except a period supporting a legacy system in each frame, if the subframe indexes l, m and n are used as UL subframe indexes, each of the subframe indexes l, m and n ranges from 0 to U−1, U being the number of UL subframes defined in a period except a period supporting a legacy system in each frame, and the frame indexes are calculated by a subframe index order corresponding to an entire duration including a period supporting a legacy system within each frame.

57. The apparatus of claim 53, wherein if the subframe indexes l, m and n are used as DL subframe indexes, the DL subframe indexes are reordered indexes for DL subframes used for communication from a Relay Station (RS) to an MS, if the subframe indexes l, m and n are used as UL subframe indexes, the UL subframe indexes are reordered indexes for UL subframes used for communication from the MS to the RS, and the frame indexes are calculated by a subframe index order corresponding to an entire duration used for a communications with the RS within each frame.

58. The apparatus of claim 53, wherein when the HARQ operation is performed in a Base Station (BS), the transceiver receives the HARQ subpacket that starts in the #m UL subframe of the #j frame from a Mobile Station (MS), transmits the HARQ feedback for the HARQ subpacket in the #l DL subframe of the #k frame to the MS, and receives a retransmission of the HARQ subpacket, starting from the #m UL subframe of the #p frame from the MS by the BS.

59. The apparatus of claim 53, wherein when the HARQ operation is performed in a Mobile Station (MS), the transceiver transmits the HARQ subpacket that starts in the #m UL subframe of the #j frame to a BS, receives the HARQ feedback for the HARQ subpacket in the #l DL subbframe of the #k frame from the BS, and retransmits the HARQ subpacket, starting from the #m UL subframe of the #p frame to BS.

60. The apparatus of claim 46, wherein if an assignment A-MAP IE including the data burst assignment information indicates a long Transmission Time Interval (TTI) transmission on a TDD mode, transmission of an HARQ subpacket corresponding to the data burst starts in a #0 UL subframe of a #j frame and the HARQ feedback for the HARQ subpacket is transmitted in an #l UL subframe of a #p frame, and
   wherein the long TTI transmission means that the HARQ subpacket spans two or more subframes.

* * * * *